United States Patent [19]

Ishida et al.

[11] Patent Number: 5,202,555
[45] Date of Patent: Apr. 13, 1993

[54] FOCUS DETECTING DEVICE FOR USE WITH CAMERAS WITH CORRELATION AND CONTRAST DETECTING MEANS

[75] Inventors: Tokuji Ishida, Daito; Masataka Hamada, Osaka, both of Japan

[73] Assignee: Minolta Camera Kabushiki Kaisha, Osaka, Japan

[21] Appl. No.: 922,168

[22] Filed: Jul. 29, 1992

Related U.S. Application Data

[60] Division of Ser. No. 733,961, Jul. 22, 1991, Pat. No. 5,138,143, which is a continuation of Ser. No. 565,043, Aug. 8, 1990, abandoned, which is a continuation of Ser. No. 455,815, Dec. 19, 1989, Pat. No. 4,950,879, which is a continuation of Ser. No. 374,623, Jun. 29, 1989, abandoned, which is a continuation of Ser. No. 307,180, Feb. 3, 1989, abandoned, which is a continuation of Ser. No. 180,293, Apr. 11, 1988, abandoned, which is a continuation of Ser. No. 921,339, Oct. 20, 1986, abandoned, which is a continuation of Ser. No. 570,012, Jan. 10, 1984, Pat. No. 4,636,624.

[30] Foreign Application Priority Data

Jan. 10, 1983 [JP] Japan .................................. 58-2622
Jun. 23, 1983 [JP] Japan ............................... 58-113936

[51] Int. Cl.$^5$ .............................................. G01J 1/20
[52] U.S. Cl. ................................... 250/201.8; 354/408
[58] Field of Search ............... 250/201.8, 201.2, 208.1, 250/208.2, 208.3, 214 R; 356/1, 4; 354/406, 407, 408

[56] References Cited

U.S. PATENT DOCUMENTS 3,875,401 4/1975 Stauffer .
3,945,023 3/1976 Stauffer .
4,078,171 3/1978 Stauffer .
4,184,968 1/1980 Stauffer .
4,253,752 3/1981 Ichihara .
4,284,335 8/1981 Takemae et al. .
4,297,571 10/1981 Utagawa et al. .
4,329,033 5/1982 Masunaga .
4,333,007 6/1982 Langlais et al. .
4,334,150 6/1982 Herbst et al. .
4,334,151 6/1982 Herbst et al. .
4,336,450 6/1982 Utagawa et al. .
4,387,975 6/1983 Araki .
4,410,258 10/1983 Aoki et al. .
4,417,139 11/1983 Kusaka .
4,423,936 1/1984 Johnson .
4,460,261 7/1984 Eguchi et al. .
4,474,449 10/1984 Kusaka .
4,483,602 11/1984 Aoki et al. .
4,488,799 12/1984 Suzuki et al. .
4,500,778 2/1985 Kusaka et al. .
4,510,384 4/1985 Grimbleby et al. .
4,523,829 6/1985 Eguchi et al. .
4,613,748 9/1986 Imani .
4,634,851 1/1987 Ogasawara et al. .
4,647,174 3/1987 Tsunekawa et al. .
4,676,623 6/1987 Akashi et al. .................... 250/201.8

FOREIGN PATENT DOCUMENTS 52-95221 8/1977 Japan .
55-45031 3/1980 Japan .
55-98709 7/1980 Japan .
55-98710 7/1980 Japan .
55-146423 11/1980 Japan .
55-157220 11/1980 Japan .
57-108810 7/1982 Japan .

Primary Examiner—David C. Nelms
Attorney, Agent, or Firm—Price, Gess & Ubell

[57] ABSTRACT

A focus detecting device is provided with first and second line sensors and first and second image forming lenses which are located behind a predetermined focal plane of the objective lens to receive the object lights for forming first and second images on the first and second line sensors, respectively. The image signal generated by the first line sensor is divided into a plurality of block signals each consisting of a predetermined number of picture element outputs and each block signal is compared with groups of picture element outputs of the second line sensor, with the groups shifted sequentially, to find a group which best coincides therewith and the distance between the first and second images on the line sensors is calculated in accordance with the shift position of the group thus determined, for calculation of the amount and direction of defocus of the object image on the focal plane. The calculated distance between the first and second images may be corrected in accordance with manual adjustment of adjustable means and magnification data of the first and second images stored in storage means.

3 Claims, 19 Drawing Sheets

1ST BLOCK

3RD BLOCK

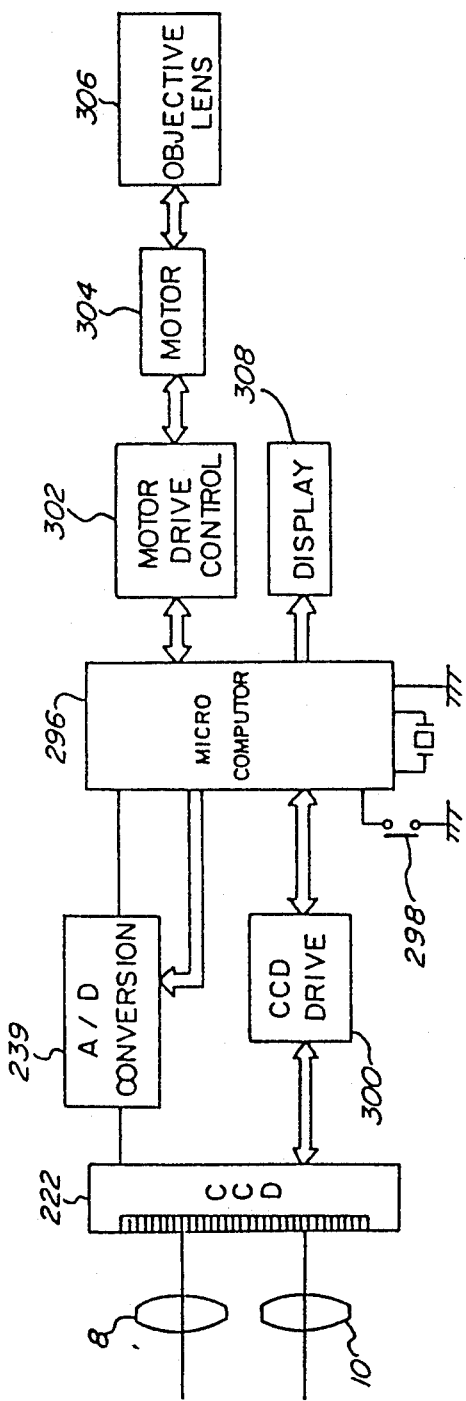
FIG. 28
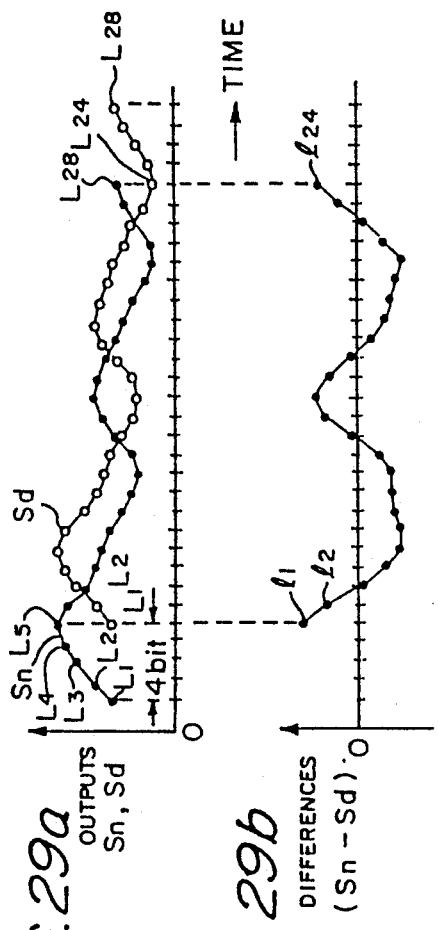
FIG. 29a
FIG. 29b

FOCUS DETECTING DEVICE FOR USE WITH CAMERAS WITH CORRELATION AND CONTRAST DETECTING MEANS

This is a divisional application of Ser. No. 733,961, filed on Jul. 22, 1991 (which will issue as U.S. Pat. No. 5,138,143 on Aug. 4, 1992), which is a continuation of Ser. No. 565,043 filed on Aug. 8, 1990 (abandoned), which is a continuation of Ser. No. 455,815 filed on Dec. 19, 1989, issued as U.S. Pat. No. 4,950,879 on Aug. 21, 1990, for a FOCUS DETECTING DEVICE FOR USE WITH CAMERAS, which is a continuation of U.S. Ser. No. 374,623 filed on Jun. 29, 1989, abandoned, which is a continuation of U.S. Ser. No. 307,180, filed on Feb. 3, 1989, abandoned, which is a continuation of U.S. Ser. No. 180,293, filed on Apr. 11, 1988, abandoned, which is a continuation of U.S. Ser. No. 921,339 (abandoned) filed on Oct. 20, 1986, which is a continuation of U.S. Ser. No. 570,012, filed on Jan. 10, 1984, and issued as U.S. Pat. No. 4,636,624 on Jan. 13, 1987.

BACKGROUND OF THE INVENTION

1. Field of the Invention

The present invention relates to a focus detecting device. for use with cameras, which is adapted to measure object lights having passed through our objective lens (i.e., picture taking lens) for detecting the focus condition of an object image formed on a film exposure plane.

2. Description of Prior Art

There have been proposed first and second types of focus detecting devices for detecting a correlation between two object images, which are formed by first and second parts of object lights having passed through an objective lens at its first and second portions distant from the optical axis, respectively. A principle construction of the optical system is used in the first types of focus detecting devices is shown in FIG. 1. At a position equivalent to a predetermined focal plane of an objective lens 2 (i.e., a film exposure plane) there is disposed a condensor lens 4 and behind this condensor lens are provided a pair of image forming lenses 6 and 8 and a pair of line sensors 10 and 12. Line sensors 10 and 12 are disposed on image forming planes of image forming lenses 6 and 8 and each of them is composed of a CCD (change coupled device). In a front focus condition where an object image to be the subject of the focus detection is formed in front of the predetermined focal plane of the objective lens, two images 14 and 16 formed by image forming lenses 6 and 8 on line sensors 12 and 14 respectively are near the optical axis 18 of the objective lens. In contrast, two images 14 and 16 are remote from the optical axis in a rear focus condition where the object image is formed behind the predetermined focal plane of the objective lens. In an in-focus condition where the object image is formed on the predetermined focal plane, the distance between the corresponding points of two images 14 and 16 becomes a specific length determined by the construction of the optical system. Accordingly, if the patterns of the light distributions on line sensors 10 and 12 are converted into electrical signals respectively, the focus condition can be found out by comparing these electrical signals to detect the positional relationship between the two images. This type of focus detecting devices is disclosed, for example, in Japanese utility model laid-open publication No. Sho. 55-157220, Japanese patent laid-open publication Nos. Sho. 52-95221, Sho. 55-45031, Sho. 55-98709, Sho. 55-98710 and Sho. 55-146423 and U.S. Pat. No. 3,875,401.

In U.S. Pat. No. 4,333,307 which disclose the second type of focus detecting device for detecting correlation between two object images, and a method to detect both the amount and direction of defocus of an object image at a signal time is disclosed. In this patent a number of detector pairs each consisting of first and second small detectors are arranged behind a small lenslet which is in turn arranged on a predetermined focal plane of an objective lens and any correlation between two object images, one being formed on the first detectors of the pairs and the other on the second detectors of the pairs, is detected by comparisons between the outputs of the first detectors and those of the second detectors. The comparisons are carried out by shifting the outputs of the second detectors one by one and by changing the number of outputs of the first and second detectors to be compared with one another. The reason for the change of the number of the outputs is that, with the outputs of the second detectors shifted, some of the outputs of the first detectors will have no counterpart to be compared therewith in the outputs of the second detectors. If a coincidence is found between the outputs of the first detectors and those of the second detectors by a comparison at a certain shift position, then the shift position is indicative of the amount of defocus and the direction of the shift is indicative of the direction of defocus. This method disclosed in U.S. Pat. No. 4,333,307 will be similarly applicable to the first type focus detecting devices as mentioned above with reference to FIG. 1. However, there is a problem in the methods in that the results of the comparisons between the outputs of the first detectors and those of the second detectors cannot be equally evaluated because the number of outputs of the first and second detectors is different for each comparison. Thus, some conditions on the side of an object will cause failure in finding out a comparison result which represents in a coincidence between the outputs of the first detectors and those of the second detectors.

By the way, there are still problems in order to put the first type of focus detecting type into practical use. One of the problems is that it is difficult to assemble the optical system exactly in the same manner as it is designed, so that the distance between the corresponding points of two images 14 and 16 becomes different for each individual product even in the same focus condition. This makes it hard to manufacture this type of focus detecting devices with a required operational accuracy. Additionally, the magnification of the two images formed on the line sensors varies with the focus condition of the object image and this also undesirably affects the distance between the two images to be detected. Thus, accurate detection of the amount of defocus cannot be expected without correction of the detected distance by the magnification data of the two images. Moreover, in the case where the line sensors 12 and 14 consist of CCDs, it becomes necessary to make electric charges stored therein completely empty before actually starting a focus detection operation. To this end, when a focus detection start switch is closed, transfer pulses are sent to the CCDs and a transfer operation to discharge the electric charges stored in the CCDs is repeatedly carried out several times in accordance with the transfer pulses. However, since transfer pulses substantially equal to the number of the picture elements of the CCDs are necessary for each time of a transfer operation, it takes a considerably long time to complete the several transfer operations and this results in significant retardation of the start of the actual focus detection. Preferably this problem should also be solved in order to put the first type of focus detecting device into practical use.

SUMMARY OF THE INVENTION

Accordingly it is a general object of the present invention to improve the first type of focus detecting device as mentioned above with reference to FIG. 1.

One of the particular objects of the present invention is to provide a first type of focus detecting device which is capable of detecting the amount of defocus of an object image by an improved method for finding a coincidence between the two object images formed on the two line sensors respectively.

Another particular object of the present invention is to provide a first type of focus detecting device which, even with errors that may occur in assembling of its optical system, can still carry out the detection of the amount of defocus with high accuracy through manual adjustment of adjustable means.

Still another particular object of the present invention is to provide a first type of focus detecting device which can carry out the detection of the amount of defocus with high accuracy through correction by the magnification data of the two images formed on the two line sensors.

Yet another particular object of the present invention is to provide a first type of focus detecting device which employs CCDs for the line sensors and which requires a shorter period of time for becoming ready for focus detection after an operation to start the focus detection cycle.

According to the present invention, it is proposed to divide the image signal generated by one of the first and second line sensors into a plurality of block signals. Each of the block signals consists of a predetermined number of picture element outputs of one of the line sensors and is compared with groups of picture element outputs of the other of the line sensors with the groups shifted sequentially, whereby the comparison results thus obtained can be equally evaluated. The number of picture element outputs of each of the groups is identical with that of the block signal. For each of the block signals one of the groups which best coincides therewith is found and it is determined which of the groups thus found for all the block signals is most reliable. The distance between the two object images on the first and second line sensors is calculated in accordance with the shift position of the group determined to be most reliable and the amount of defocus is calculated in accordance with the calculated distance. According to the present invention, it is also proposed to produce a secondary image signal by use of a technique of autocorrelation wherein the picture element outputs of the first and second line sensors are shifted by a unit of one or more picture elements for comparison with themselves. The secondary image signal obtained by the comparison from the outputs of one of the line sensors is divided into a plurality of block signals and each of these block signals is compared with groups of the secondary image signal obtained by the comparison from the picture element outputs of the other of the line sensors. Thereafter the amount of defocus is calculated in the same manner as described above.

Another proposition of the present invention is to provide the first type focus detecting device with manually adjustable means for correcting the calculated distance between the two object images on the first and second line sensors in accordance with a manual adjustment thereof. In still another proposition of the present invention, storage means is provided to store the magnification data of the two images on the first and second line sensors, the data being different from one another in dependence upon the distance between the two images, i.e., in dependence upon the focus condition. Correction is made to the calculated distance by the magnification data from the storage means corresponding to the calculated distance. Yet another proposition of the present invention relates to the case where the first and second line sensors consist of a CCD respectively. A CCD driver for driving the CCD includes a transfer pulse generator for generating transfer pulses which cause a transfer section of the CCDs to transfer the electric charges received thereby from picture elements of the CCDs and means for controlling the period of the transfer pulses in such a manner that the period of the transfer pulses generated for making the electric charges stored in the CCDs empty before start of actual focus detecting operation is shorter than that of the transfer pulses generated during the focus detecting operation. It is possible therefore to start the actual focus detecting operation at an earlier timing.

The above and other objects, features and advantages of the present invention will become more apparent from the following description of preferred embodiments of the present invention taken in conjunction with the accompanying drawings.

BRIEF DESCRIPTION OF THE DRAWINGS

FIG. 28 is a block diagram of an automatic focusing system of a camera to which the circuitry shown in FIG. 24, constructed by use of a micro-computer, is applied;

FIG. 29(a) shows graphs plotting the picture element outputs Sn of the basic section and these Sd shifted by a unit of four picture elements, respectively;

FIG. 29(b) shows a graph plotting differences (Sn−Sd) which are the secondary outputs;

DESCRIPTION OF THE PREFERRED EMBODIMENTS

Figure 2:
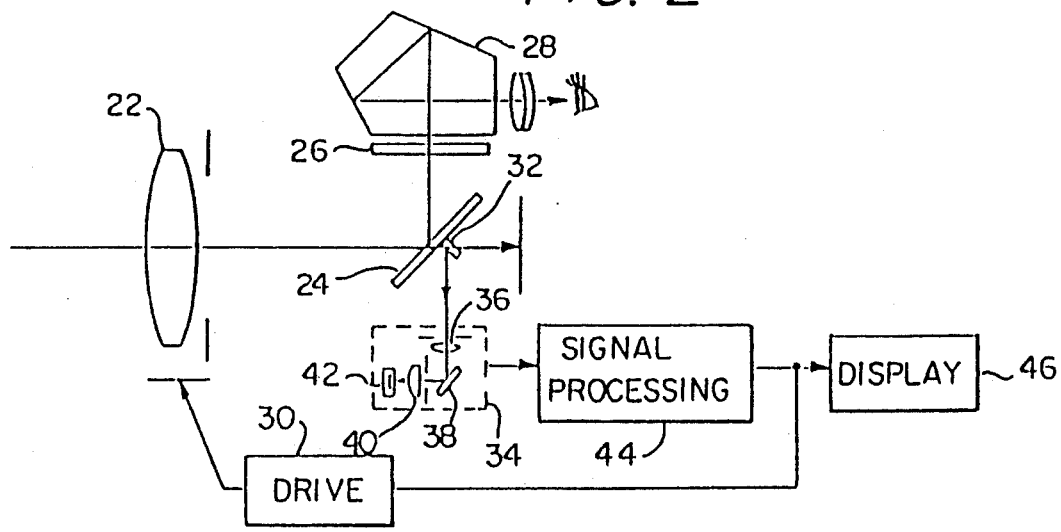
FIG. 2 is a schematic illustration of an arrangement of a focus detecting device according to the present invention applied to a single lens reflex camera.

FIG. 2 shows an exemplary arrangement of the optical system and its relating parts of a single lens reflex camera including an automatic focus detecting device according to the present invention. With reference to FIG. 2, objective lens 22, reflex mirror 24, focusing plate 26, pentagonal roof prism 28 etc. are known components which constitute a single reflex camera. However, when the camera is designed to adjust focusing automatically in accordance with using the output of a focus detecting apparatus, objective lens 22 is constructed such that the optical system movable for focusing is driven by lens driving device 30 including a motor. Reflex mirror 24 is formed at its central portion with a semitransparent or half-mirror portion and a sub-mirror 32 is disposed at the back thereof to direct a part of the light from the object to light receiving section 34 of the focus detecting device located at the bottom of the mirror box. Light receiving section 34 consists of a condenser lens 52, a reflex mirror 38 and a pair of image forming lens 54, 56, a pair of line sensors 62, 64 etc. The outputs of line sensors 62 and 64 are processed in a manner as described later by signal processing circuit 44 which generates the defocus signal representing the amount of defocus of an object image from a predetermined focal-plane and direction of the defocus. Display device 46 indicates the focus condition based on the defocus signal and the objective lens is driven to the in-focus position by driving device 30.

Figure 3:
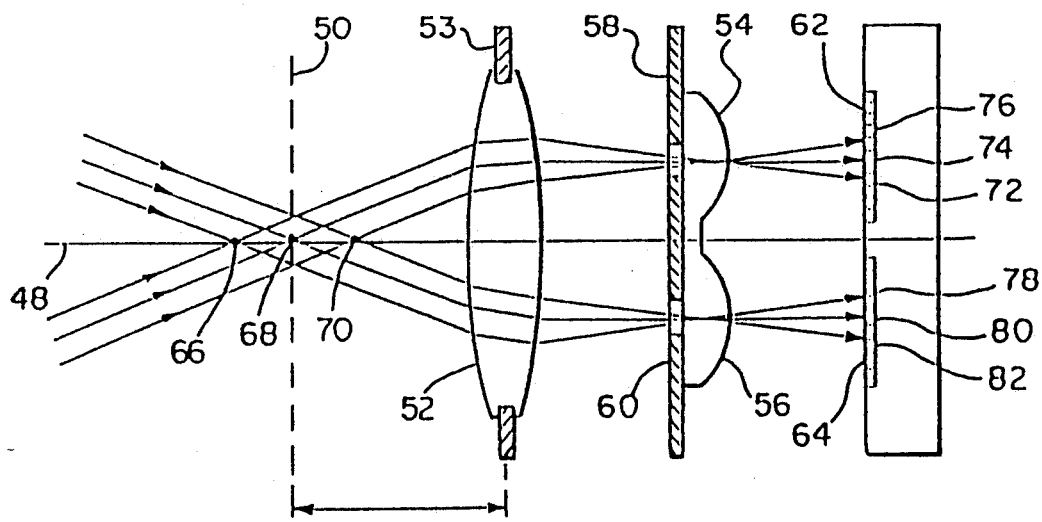
FIG. 3 is an enlarged view of the optical system of the focus detecting device according to the present invention.

FIG. 3 shows the optical system of light receiving section 34 and in the Figure straight line 48 shows the optical axis of the objective lens while broken line 50 shows an equivalent plane which is equivalent to the film exposure plane. Condenser lens 52 is not positioned on equivalent plane 50 which is conjugate with the predetermined focal plane but at the position which is apart from equivalent plane 50 by an amount as much as the focal distance f1. Image forming lenses 54 and 56 are installed at the back of condenser lens 52 symmetrically with respect to optical axis 48. In front of those image forming lenses, field-of-view restricting masks 58 and 60 are disposed. On the image plane of each of image forming lenses 54 and 56, line sensors 62 and 64 composed of CCD are installed. It should be noted that condenser lens 52 is located at a position aparts or off from equivalent plane 50 for the following reasons: The optical system is constructed in such a way that the object image on the exposure equivalent plane 50 is reformed on the line sensors 62 and 64. However, when condenser lens 52 is located on this equivalent plane 50, possible crack or dust on the surface of the lenses, will cause an unwanted image on the line sensor thereby generating noise to the signal of the real image of the object. Consequently, if condenser lens 52 is off the equivalent plane, such noise will be avoided. Another advantage of such location of the condenser lenses is that the condenser lens can be incorporated within the camera body without significant alterations of the camera optical system. Also masks 58 and 60 are constructed in relation with the condenser lens such that they only allow the passage of the object light for the portion that has passed through the aperture of the objective lens diaphragm of a certain value, for example, the aperture of F 5.6. With such construction, it is avoided that line sensors 62 and 64 receive an image of the light partially obstructed at the outside of the exit pupil of the objective lens, even when the full open aperture value of the objective lens is smaller than F 5.6 in the case various types of exchangeable lens are to be used. Thus, most of commonly used exchangeable lenses are adaptable for use with the cameras.

Next, points 66, 68, 70 on the optical axis indicate the images which are in the front focus, in-focus and rear focus condition for the object point to the front of the objective lens. The points of the incidence of light rays on line sensor 62 for the light which forms images 66, 68 and 70 are 72, 74 and 76 respectively, and the points on line sensors 64 are 78, 80 and 82 respectively.

Figure 4:
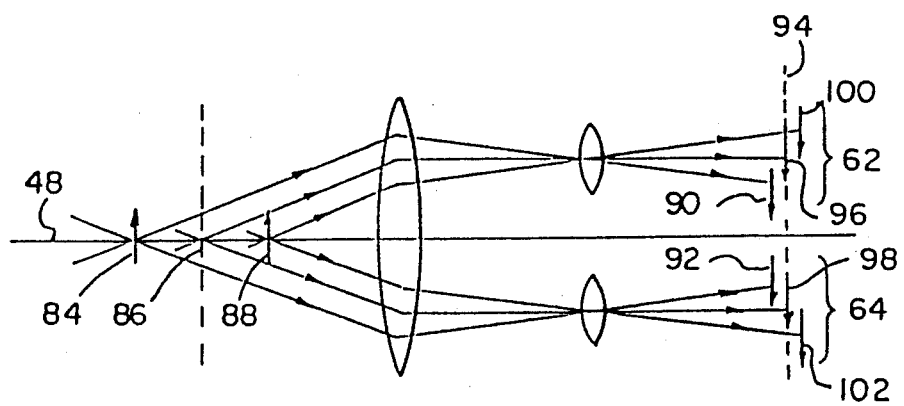
FIG. 4 is an optical diagram showing how images are formed by the optical system in a front focus condition, in an in-focus condition and in a rear focus condition, respectively.

FIG. 4 shows two images which are reformed by condenser lens 52 and by image forming lenses 54 and 56 respectively corresponding to the front focus, in focus and rear focus images 84, 86 and 88. Secondary images 90 and 92 for front focus image 84 lie on the front side of light receiving plane 94 of the line sensors and both images lie near the optical axis. Secondary images 96 and 98 for in-focus image 86 coincide with light receiving plane of the line sensors and secondary images 100 and 102 for rear focus image 88 lies in the rear of light receiving plane 94 of the line sensor and are far apart from optical axis 48. Accordingly, secondary images 90 and 92 for front focus image 84 are defocused and expanded a little on light receiving plane 94 of the line sensors. Also, secondary images for rear focus image 88 are defocused and contracted on the light receiving plane.

Figure 5:
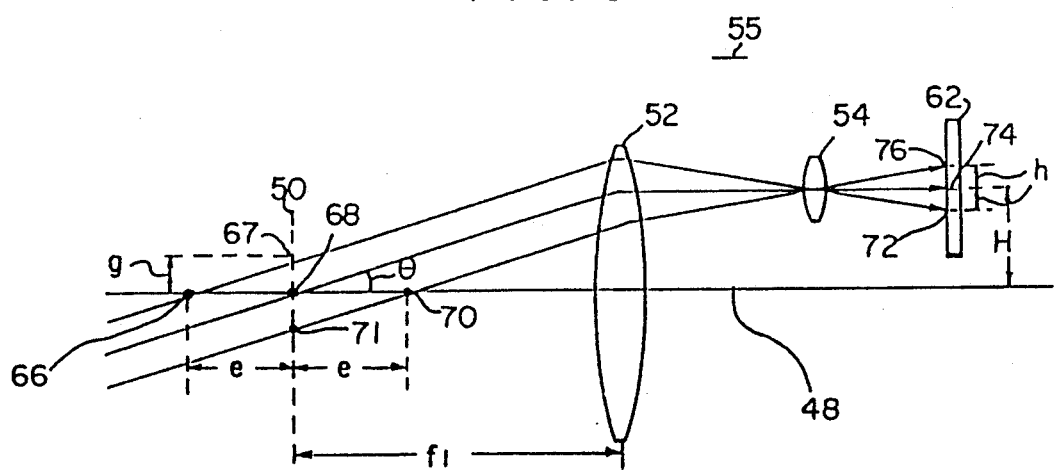
FIG. 5 is an optical diagram showing the relationship between the amount of defocus and the amount of displacement of the image on one of the line sensors.

Next, explanation will be made with reference to FIG. 5 about the relationship between the amount e of the displacement of the image from the focus position and the amount h of shifting of the image on line sensor 62. Of the light rays for forming image 68 and converging on optical axis 48 at the time of in-focus condition, are the light rays which run in parallel with optical axis 48 after passing through condenser lens 52. In the case of front-focus image 66 or rear focus image 70 which are shifted by the amount e from image 68 the above mentioned parallel light rays pass at equivalent plane 50 through points 67 and 71 which are distant by an amount g from optical axis 48. Here, it is assumed that three points 68, 67 and 71 on equivalent plane 50 are point light sources of which images are formed on line sensor by image forming optical system 55 consisting of condenser lens 52 and image forming lens 54 and that the images of the light sources are 74, 72, 76. It is also assumed that the magnification of image forming optical system 55 is $\alpha$. Where FIG. 5 is observed from a geometrical view point, the following equation can be obtained.

$$\frac{g}{e} = \frac{H}{fl} \quad (1)$$

$$\alpha = \frac{h}{g} \quad (2)$$

Eliminating g from the above two formulas, the following formula can be obtained $$e = \frac{fl}{\alpha H} h \quad (3)$$

Figure 13:
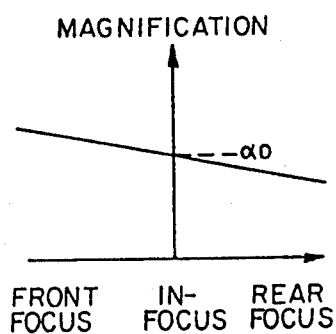
FIG. 13 shows a graph indicating how magnification of the images on the line sensors varies with the focus condition.

In the above formula (3), since $fl/\alpha H$ is a constant which is determined by the construction of the image forming optical system, the amount e of displacement can be obtained if the amount of shifting h is detected. However, since only the in-focus image can normally be formed exactly on equivalent plane 50 and other images are formed at the front or rear of the equivalent plane as shown in FIG. 4, the magnification is not a constant in a strict sense but varies according to the positions of images 66 and 70 which will become the light sources for image formation system 55. Assuming that the magnification in the in-focus condition is $\alpha 0$, the magnification at the time of front-focus is larger than $\alpha 0$ and that of rear focus is smaller than $\alpha 0$ as shown in FIG. 13. In addition, the magnification will be different according to the location of the image on the line sensor due to the aberration such as the curvature of the optical system. Accordingly, in order to calculate the amount of displacement more accurately, predetermined magnifications corresponding to the amounts h of shift as described later should be provided. The following is an explanation of a circuit which detects both the amount h of shift and the amount e of displacement.

Figure 6:
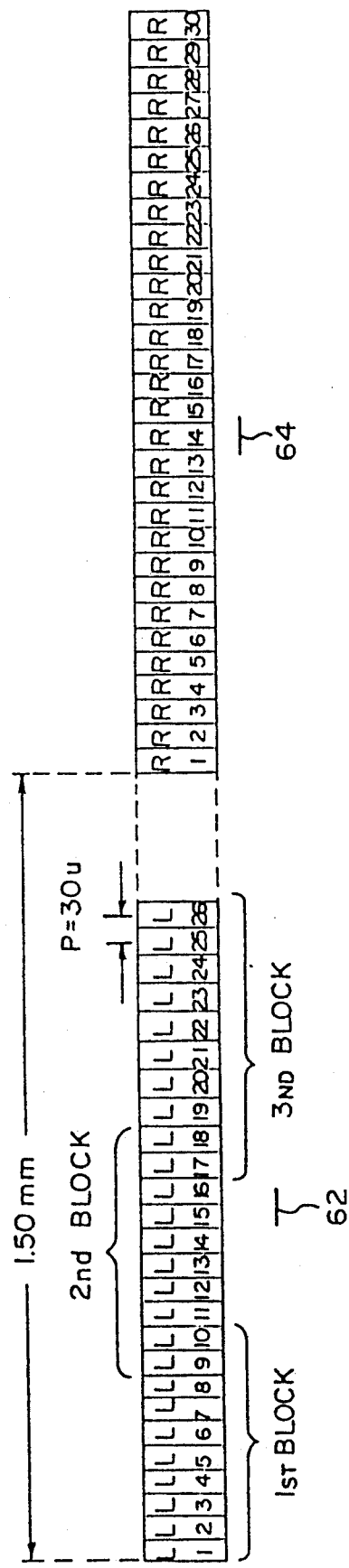
FIG. 6 is a plan view showing an arrangement of picture elements of the line sensors used in the focus detecting device according to the present invention.
Figure 8:
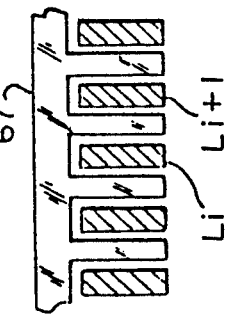
FIG. 8 is a plan view showing still another arrangement of the picture elements of the line sensors in part.
Figure 7:
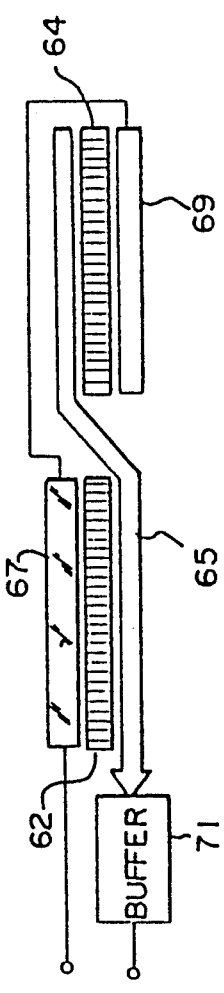
FIG. 7 is a plan view showing another arrangement of the picture elements of the line sensors.

FIG. 6 shows an embodiment of the arrangement of picture elements for line sensors 62 and 64 as illustrated in FIG. 3, in which line sensor 62 is called the basic section, and line sensor 64 is called the reference section. Picture elements (L1)–(L26) and (R1)–(R30) are respectively composed of photodiodes which constitute part of charge coupling element (CCD). It will be noted that a certain number of dummy picture elements are provided in the blank section between picture element L26 and R1, so that two line sensors 62 and 64 may be formed on a single line of CCD. Still another alternation may have charge transmitting line 65 between line sensors 62 and 64 as shown in FIG. 7 with the line connected to a buffer 71. Photodiodes 67 and 69 are provided to monitor the intensity of incident light for the determination of the integration time for CCD. It will also be noted that these monitoring diodes may be replaced with a monitoring diode 67' having a shape which fills up the gap between picture elements Li as shown in FIG. 8. Such construction can monitor the light which has almost the same intensity as those light incident on the picture elements.

Next, in the present embodiment, the picture elements in basic section 62 of the line sensor is divided into three blocks. The first, second and third blocks correspond to picture elements L1–L10, L9–L18, and L17–L26 respectively. Each block consists of ten pieces of picture elements. The number of picture elements do not necessarily be the same although, in the present embodiment, each block has ten pieces of picture elements. When the focus condition is detected, the image on each block is compared with the image on reference section 64. For example, when the image of first block is used, the following comparison will be performed. First, the image on picture elements R1–R10 of the reference section is compared with the images of the first block. In this case, the contents of comparison are shown by the formula 4 and the total sum of the absolute values of the differences in the outputs of each couple of picture elements L1 and R1, L2 and R2 up to L10 and R10, is computed.

$$H1(1) = \sum_{k=1}^{10} |Lk - Rk| \qquad (4)$$

Next, the image on the picture elements R2–R11 of reference section 64 shifted by one picture element are compared with the images on the first block of the previously described basic section 62. The contents of the processing are shown in the equation (5).

$$H1(2) = \sum_{k=1}^{10} |Lk - Rk + 1| \qquad (5)$$

Thereafter the comparisons shown in the following equation are performed in the same manner and the results of a total of twenty one comparison are obtained.

$$H1(3) = \sum_{k=1}^{10} |Lk - Rk + 2| \qquad (6)$$

$$\vdots$$

$$H1(21) = \sum_{k=1}^{10} |Lk - Rk + 20| \qquad (7)$$

Now, when the image on the first block is coincident with the image on picture elements R2–R11, H1 (2) may be the minimum among the twenty one comparison results. By finding the picture element area presenting this minimum value, an approximate focus position can be detected.

The comparing operations which are similar to the comparing operations using the images of the first block will be conducted using the images of the second and third blocks of basic section 62. Generally, the content of each comparison is expressed by the following equation.

$$H1(l) = \sum_{k=1}^{10} |Lk - Rk + l - 1| \qquad (8)$$

$$H2(l) = \sum_{k=1}^{10} |Lk + 8 - Rk + l - 1| \qquad (9)$$

$$H3(l) = \sum_{k=1}^{10} |Lk + 16 - Rk + l - 1| \qquad (10)$$

(wherein $l = 1, 2, 3 \ldots 21$)

With the above comparing operations, results of a total of twenty one comparisons for each block and results of grand total of sixty three comparison are obtained. The optical system is arranged such that, at the time of in-focus, the image on the second block coincides with the image on the part of picture elements R11 to R20 in reference section 64. Now, when the in-focus condition is attained, the images of the first block and that of the third block coincide with the images in the corresponding sections of picture elements R3–R12 and that of R19–R28 respectively. In this case, the detection of focus position is possible by using any block for some condition of the image. However, in the blocks where an image having a low contrast is formed, it will sometimes be impossible to determine the smallest value among the results of comparison. Accordingly, a plurality of blocks in which images having contrasts exceeding a certain level are selected so that the focus position can be detected from the results of comparisons corresponding to those blocks.

Also, since in the case of the front focus condition, as shown in FIG. 4, the image in basic section 62 coincides with that in reference section 64 in a position near the optical axis, the image in the third block coincides with the image in a certain part of reference section 64. Conversely, in the case of the rear focus, since the two images coincide in a position distant from optical axis 48, the image of the first block coincides with the image in a certain part of reference section 64. Consequently, in the case of the out of focus condition, it is possible to find out the minimum value among the results of comparisons concerning an image of the first block or third block. However, when there is not a sufficient contrast, the focus detection will be regarded as impossible and the detection of the minimum value will not be carried out. It will be noted that picture elements L9 and L10, and also L17 and L18 are commonly used by the first and second blocks, and by the second and third blocks respectively. Thus when the picture elements are commonly used in this manner, the focus detection can be made even when no contrast exists in other picture element areas than, for example, in the part of picture elements L9 and L10. When no picture element is commonly used, no contrast will be found in each block and the focus detection can not be made if the contrast of image exists only at the border of two blocks.

Now, if the minimum value of comparison results is detected in any block and the area in which the images coincide with each other is identified, the amount h of displacement from the focal or in-focus position may be specified. However, the accuracy of the amount of displacement which can be obtained in the above processes may be limited to a degree depending upon the resolution commensurate with the pitch in the arrangement of the picture elements. Accordingly, the accuracy of the detection of the amount of displacement should be improved by the compensation for error factors due to the optical system of the focus detecting apparatus, as well as by an interpolation computation processing.

Figure 9A:
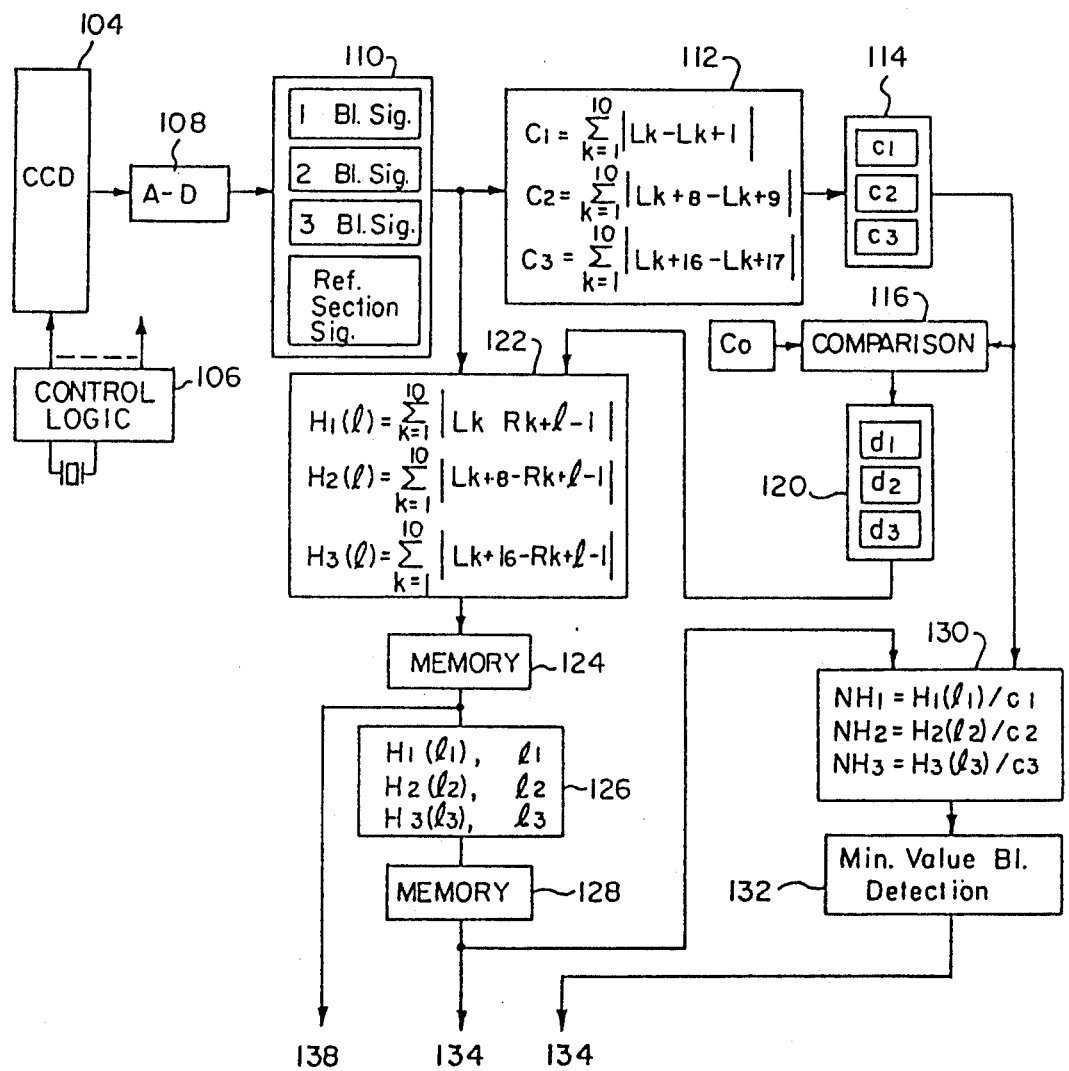
FIG. 9(a) and 9(b) are block diagrams showing an embodiment of the signal processing circuitry of the focus detecting device according to the present invention.

FIGS. 9 (A) and (B) are block diagrams showing the circuit construction which processes the image pattern signals from the line sensors as previously outlined. This signal processing circuit has a control logic 106 which generates control signals for controlling the operations of the whole system including CCD 104. Each picture element signal which is serially transmitted from CCD 104 is, for example, successively converted into 8-bit digital signal by analog/digital converter 108, and the converted signal is stored individually in respective random access memory 110 at each predetermined address. When the storage of the picture element signal is completed, contrast C1, C2, and C3 for the first, second and third block is detected by contrast detecting circuit 112 according to the data stored in the basic section and it is determined whether the level of each contrast exceeds a predetermined level. As shown by the following equations, the constrasts C1, C2, and C3 correspond to the total sum of the absolute values of the differences in the outputs for adjacent picture elements in the basic section 62. It is assumed here that the calculation of the contrast shall not be made beyond the block area. Also, the contrast may be obtained from the difference of the outputs of each pair of the picture elements at every other one or every more number of elements.

$$C1 = \sum_{k=1}^{9} |Lk - Lk + 1| \qquad (11)$$

$$C2 = \sum_{k=1}^{9} |Lk + 8 - Lk + 9| \qquad (12)$$

$$C3 = \sum_{k=1}^{9} |Lk + 16 - Lk + 17| \qquad (13)$$

Contrasts C1, C2, and C3 obtained are stored in respective memories 114 at predetermined addresses, and are compared with predetermined level C0 by comparator circuit 116. Comparator circuit 116 produce an output of logic "1" when the contrast being compared exceeds the level C0, and logic "0" when the contract is lower than the level, and the outputs d1, d2, and d3 as the result of the comparison for contrasts C1, C2 and C3 are stored in memory 120.

Next, the comparison between the image of each block and the image of the reference section is performed by image comparison circuit 122. In this case, the comparison is not carried out for the block image whose contrast does not exceed the prescribed level C0, and only the image of the block whose contrast exceeds the prescribed level C0 is compared with the image in the comparison section. The contents of these comparison are as shown by the equations 9 and 10. A total of twenty one comparison results are obtained for each block and they will be stored one after another in memory 124 at predetermined addresses. Next, the minimum values H1 (l1), H2 (l2) and (l3) of the respective comparison results obtained for the blocks and the ordinal number l1, l2, and l3 of the comparisons for the minimum values are retrieved by retrieval circuit 126 and the results are stored in memory 128.

Next, normalizing circuit 130 calculates the ratios between contrast C1, C2, and C3 and the above minimum values H1 (l1), H2 (l2), and H3 (l3) for the blocks whose contrasts exceed the prescribed level. These relations are expressed by the following equations.

$$NH1 = \frac{H1(l1)}{C1} \qquad (14)$$

$$NH2 = \frac{H2(l2)}{C2} \qquad (15)$$

$$NH3 = \frac{H3(l3)}{C3} \qquad (16)$$

These ratios have the following meanings. As previously described, when the objective lens is at an in-focus position or in its vicinity, there may sometimes be a case where the focus detection can be made by using any one of the three blocks. In such case, there may arise a problem which block should be selected for the optimum operation. Also there may occur a problem of judgement which block should be selected for detecting the front focus or rear focus status when under the out of focus condition. It may be thought right for the selection of a specific block that the block having the smallest value of the minimum values H1 (l1), H2 (l2) and H3 (l3) may be selected, but this is not appropriate. Generally, the contrast conditions of images are not the same. For example, an image having a larger contrast may appear in the first block area and images having less contrast may appear in other blocks. When the coincidence of two image patterns is detected, it is advantageous that the images have larger contrast. Accordingly, the contrast should be taken into account as another factors for selecting the specific blocks. Now, let us consider comparison results H1 (l1−1) and H1 (l1+1) for the case when the picture elements to be compared are selected from the location displaced by one pitch with respect to the minimum value H1 (l1) for the first block. If this minimum value H1 (l1) is supposed to be for the in-focus condition, either (l1−1) or H1(l1+1) may approximately coincide with contrast C1 obtained by contrast detecting circuit 112. This is because contrast C1, comparison results H1(l1−1) and H1(l1+1) are related to the differences in the outputs of the adjacent picture elements. They are different in that, while contrast C1 is obtained for the same image, the comparison results are obtained for different images. Thus, the value NH1 which is obtained by dividing the minimum value H1(l1) by contrast C1 approximately corresponds to the ratio of the minimum value H1(l1) to the comparison result obtained by with the compared elements being selected from the location displaced by one pitch of picture element. This is expressed by the following equation.

$$NHi = \frac{Hi(l1)}{Ci} \approx \frac{Hi(li)}{Hi(li \pm 1)} \qquad (17)$$

wherein i=1, 2 or 3.

NHi is referred to as a normalization index hereinafter. It is assumed that the normalization index is minimum of the three values for the block which corresponds to the in-focus or approximate in-focus condition and which has a large contrast and it is determined that the selection of the block is made in accordance with such assumption.

In practice, the light distribution pattern of the image in the basic section does not completely coincide with that in the reference section due to the aberration of the optical system and asymmetry in the positions of those images with respect to the optical axis and other reasons, so that the minimum value Hi(li) will not become zero. Also, in the case of out-of-focus condition, the normalization index may have a comparatively large value for the blocks wherein no coincidence of images with the image on the reference section is seen. Consequently, a predetermined reference value NH0 is determined regarding the normalization index and it is to be regarded that the focus detection is impossible when the normalizing index exceeds the above reference value. Thus, when the minimum value of the normalization indexes which are three at most is smaller than the reference value NH0, the detected data for the block corresponding to this minimum value are adopted as data indicating the amount of displacement from the in-focus condition.

Namely, a real minimum value is obtained from the detection over plural blocks, by minimum value detecting circuit 132. Simultaneously, the block corresponding to the minimum value is detected, and the ordinal number lk of the comparison which has the minimum value Hk(lk) is taken out from memory 128 by selecting circuit 134. Thereafter, the normalized minimum value NHk of the block which assumes the minimum value Hk(lk) is compared with the prescribed value NHO by subtraction circuit 136 and the process proceeds to the next step when NHk is smaller than NH0. When NHk is not smaller than NH0, it is regarded that the focus detection is impossible. Now assuming that l1 is obtained for the images of the first blocks, for example, and l1 is equal to 18. This means that the image on picture elements L1-L10 will coincide with the image on picture elements R18-R27.

Let's find the distance D1 between the images on the two picture element areas. This distance D1 is the distance between picture elements L1 and R18. Assuming that the distance between picture elements L1 and R1 is 1.50 mm, and the pitch P of the picture elements is 30μ, distance D1 can be obtained by the following equation.

$$D1 = 1.50 + 0.03 \times 18 \quad (18)$$
$$= 2.04 \text{ (mm)}$$

With respect to the first block, the distance D1 of the images can be expressed by the following equation with the ordinal number l1 of comparison.

$$D1 = 1.50 + 0.03 \, l1$$

The distance D2 of the images for the second block can be obtained as follows since the distance is shorter than the distance of the first block by an amount commensurate with the sum of widths of eight picture elements.

$$D2 = 1.50 - 0.03 \times 8 + 0.03 \, l2 \quad (19)$$

The distance for the third block is shorter by eight picture element width than that for the second block, and this is expressed by the following equation.

$$D3 = 1.50 - 0.03 \times 8 \times 2 + 0.03 \, l3 \quad (20)$$

The above three equations may be generalized to the following form:

$$Dk = 1.50 - 0.03 \{8(k-1) + lk\} \quad (21)$$

Figure 10:
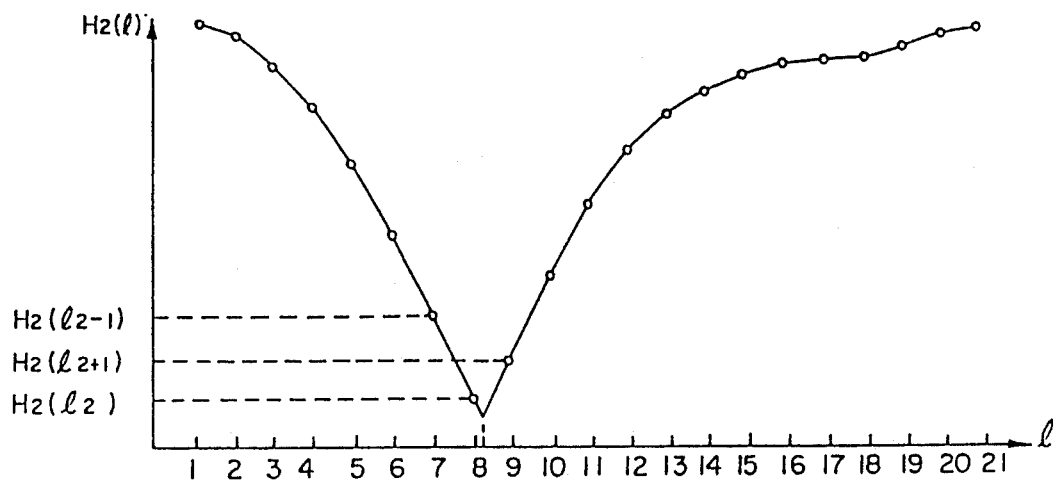
FIG. 10 shows a graph plotting image comparison results for the second block.

The critical accuracy for the distance shown by equation (21) corresponds to the pitch P of the picture element. FIG. 10 shows an example of the comparison result for the image of second block. The ordinal number l2 of the comparison which presents minimum value H2(l2) is 8. When comparison result H2(l2−1) is not equal to H2(l2+1) as illustrated in FIG. 10, the real coinciding point is not at comparison number l2=8, but at a point between the l2=8 and the comparison number l2+1=9 which presents the comparison result that is smaller next to minimum value H2(l2). If the position of such an intermediate point is to be obtained, the accuracy of the focus detection will be improved beyond the limit of more than the picture element pitch. Here, method for obtaining the intermediate point position will be described.

Figure 11:
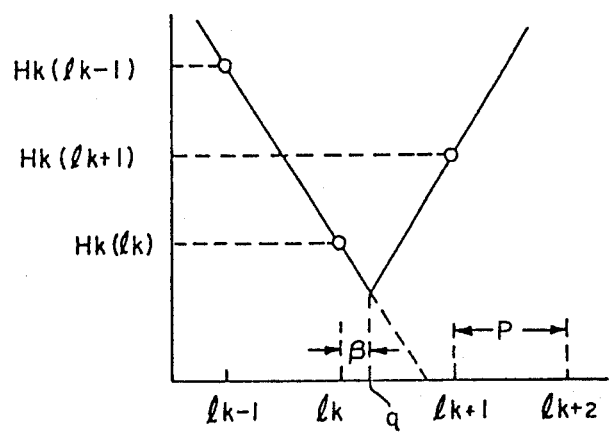
FIGS. 11 and 12 show graphs plotting minimum comparison result Hk(lk) together with adjacent comparison results Hk(lk−1) and Hk(lk+1), wherein Hk(lk−1)>Hk(lk+1) in FIG. 11 and Hk(lk−1)<Hk(lk+1) in FIG. 12, respectively.

Now, if the line connecting H2(l2−1) and H2(l2) is extended, and the line having an inclination opposite to this extended line and passing through H2(l2+1) is drawn, the point where these two lines cross each other is assumed to be a real coinciding point for the two images. If this method is applied, in the case where Hk(lk−1)<Hk(lk+1) as illustrated in FIG. 11, the length β between lk and the real coinciding point q can be expressed by the following equation in view of geometrical consideration of the diagram.

$$\beta = \frac{1}{2} \cdot \frac{Hk(lk-1) - Hk(lk+1)}{Hk(lk-1) - Hk(lk)} \cdot P \quad (22)$$

Figure 12:
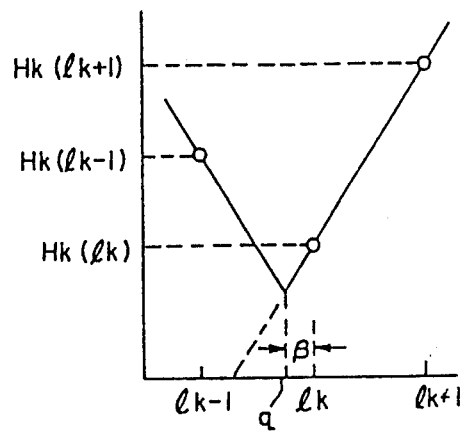

In the case where Hk(lk−1)<Hk(lk+1) which is illustrated in FIG. 12, $$\beta = \frac{1}{2} \cdot \frac{Hk(lk+1) - Hk(lk-1)}{Hk(lk+1) - Hk(lk)} \cdot P \quad (23)$$

Figure 9B:
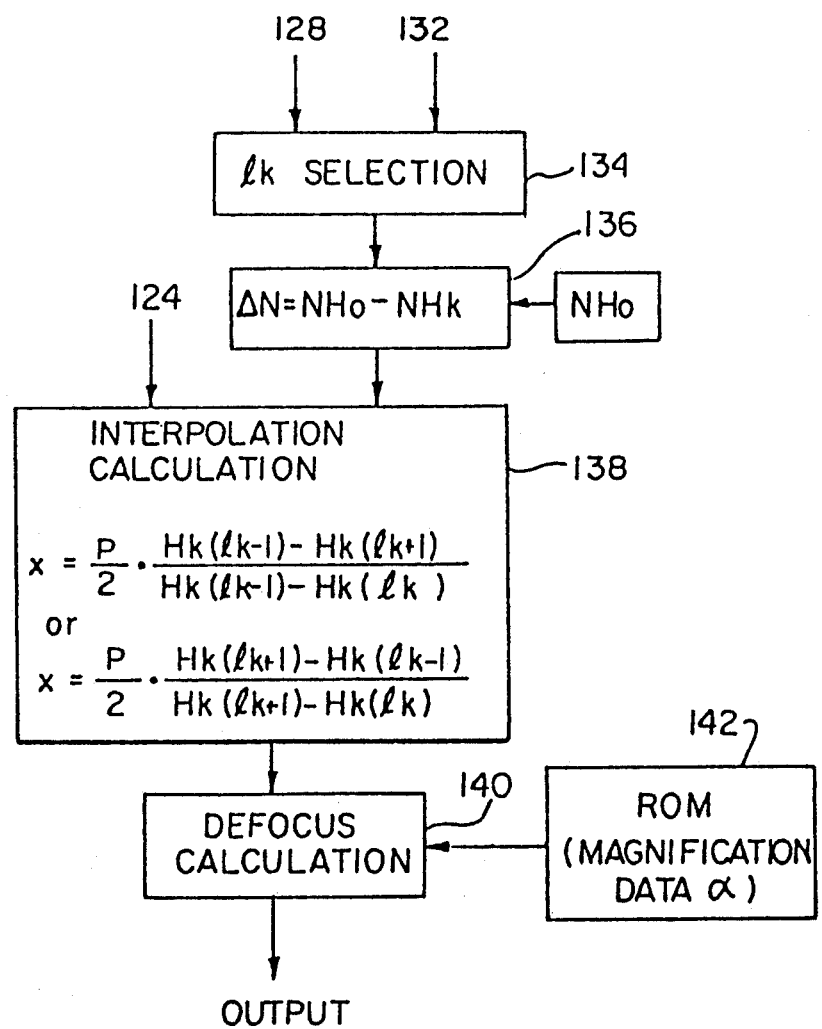

In the circuitry shown in FIG. 9B, the calculation shown by equation (22) or (23) is performed in interpolation calculating circuit 138. Then, as shown in the following equation, compensation by the interpolation value β is added to the result of the calculation of equation 21.

$$Dk' = Dk \pm \beta \quad (24)$$

Wherein the positive code of the second term on the right side of the above equation corresponds to the case where equation (22) is calculated and negative code (23) corresponds to the case where equation (23) is calculated. Thus, by virtue of interpolation circuit 138, the distance Dk between the two images in basic section 62 and reference section 64 is calculated.

Next, amount e of displacement of the image formed by the objective lens, from the in-focus position is obtained from the distance Dk by displacement amount calculating circuit 140. Where the distance between two images under an in-focus condition is assumed to be D0, the amount h of the displacement of the image in FIG. 5 is given by the following equation.

$$h = \frac{1}{2}(Dk' - D0) \quad (25)$$

Here, h<0 indicates the front focus condition and h>0, the rear focus condition. Although with the image forming optical system illustrated in FIG. 5, D0 is equal to 2H, it is desirable that an appropriate value is set for D0 at the time of assembly and adjustment of the device in the factory, since there may arise some difference in the value D0 due to errors caused in the process of assembly.

Now, when the amount h of displacement is obtained, the amount e of positional difference can be obtained based on equation (3). The magnifications o are predetermined for the values of h, from experiments to the values as illustrated in Table 1. The data of the magnification are stored in ROM 142 and amount e of the positional difference can be calculated using the stored data.

TABLE 1

| h(μ) | α | h(μ) | α |
|---|---|---|---|
| 0~100 | 0.350 | 0~−100 | 0.350 |
| 101~200 | 0.333 | −101~−200 | 0.368 |
| 201~300 | 0.315 | −201~−300 | 0.386 |
| 301~400 | 0.298 | −301~−400 | 0.405 |
| 401 or more | 0.283 | −401 or less | 0.425 |

Thus, in the manners so far described, the direction and amount of the defocus, i.e., the direction and amount of the displacement of the image from equivalent plane 50 can be obtained.

Figure 14:
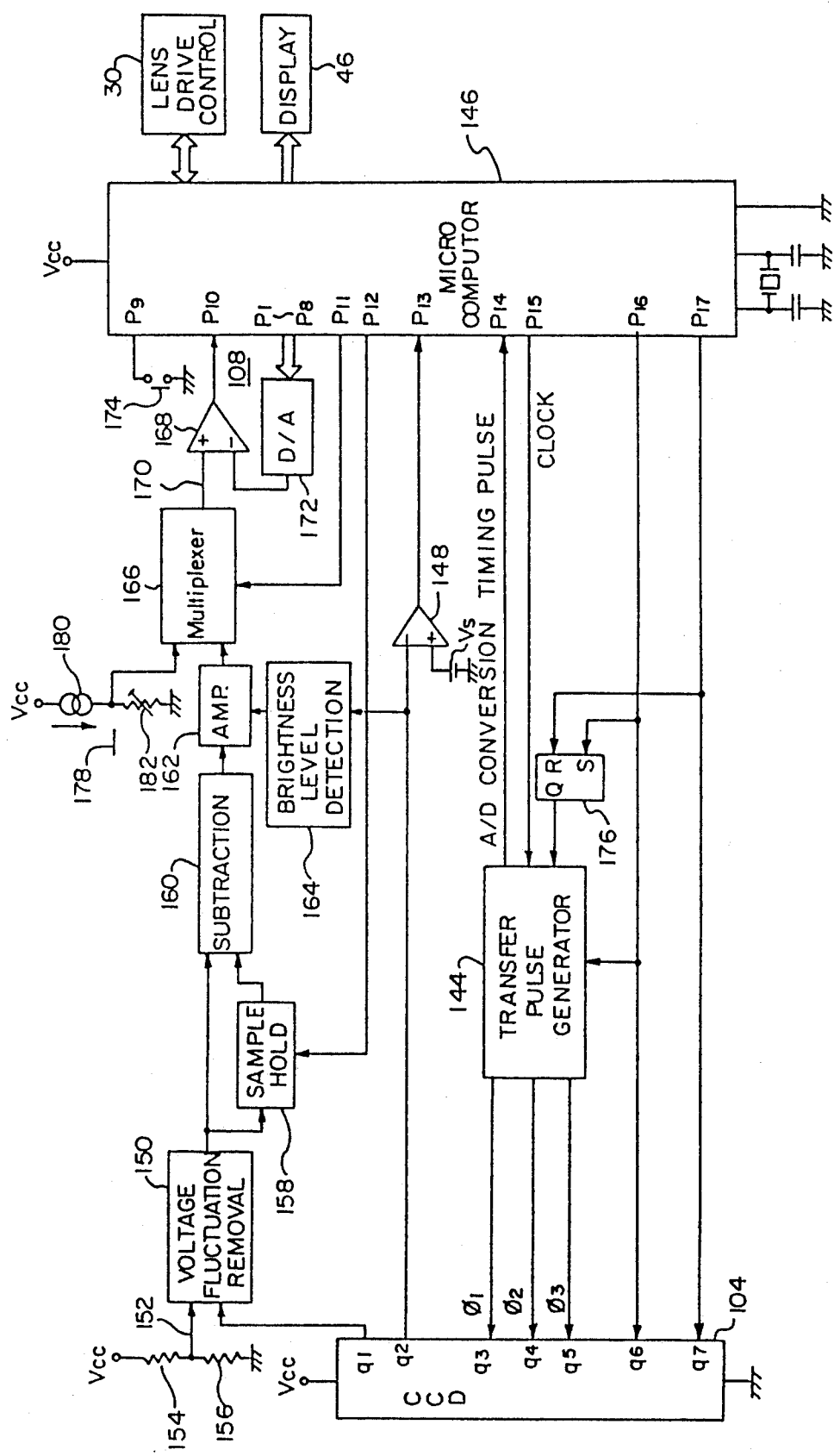
FIG. 14 is an exemplary circuit diagram of the signal processing circuitry of FIGS. 9(A) and 9(B) constructed by use of a micro-computer.

FIG. 14 is a circuit diagram showing an embodiment wherein a microcomputer is used for the signal processing circuit of the focus detecting device according to the present invention. CCD 104 receives three-phase pulses φ1, φ2 and φ3 from transfer pulse generating circuit 144, and its internal transfer section is always ready to transfer the data. In CCD 104, the electric charge of each picture element is cleaned by clear pulses delivered from terminal P17 of microcomputer 146. Accordingly, the time when the electric charge has been cleared will become the starting time for integration, i.e., operation to store electric charges.

With the start of the integration, an inclined voltage which decreases with time with the rate of decreasing being dependent on the object brightness is delivered from terminal q2 of CCD 104. This voltage is compared with a predetermined reference voltage Vs by comparison circuit 148, and comparison circuit 148 generates a "HIGH" level output voltage when the voltage drops to the level of Vs. In response to this "HIGH" level voltage, a shift pulse is generated from terminal P16. The integrated or stored electric charge in each picture element of CCD 104 is shifted to the transfer section in response to the shift pulse. The integration time for CCD 104 is from the time when the clear pulse is given to terminal q7, to the time when the shift pulse is given to terminal q6. CCD includes a plurality of the picture elements to be used as dummies and other picture elements for obtaining the dark output in addition to the picture elements shown in FIG. 6. When the shift pulse is given, CCD 104, at first, outputs the dummy signals and dark signals from output terminal q1, and then outputs the prescribed picture signals. It will be noted that since when the power supply voltage Vcc fluctuates, the varying component is superposed to the outputs of the CCD, the outputs of CCD are delivered into circuit 150 to off set and remove this fluctuation component. This voltage fluctuation removing circuit 150 receives at its input 152 a voltage which is the fraction of the power supply voltage Vcc divided by resistance 154 and 156 and delivers a voltage in accordance with the difference between the two inputs. Upon delivery of the picture element signals, the largest one of the initial dark signals of the integrated data outputs of CCD 104 is sample-held by sample hold circuit 158, and 20 thereafter, picture element signals Ri and Li are reduced by subtraction circuit 160 by as much as the magnitude of the dark signal held in sample hold circuit 158. The microcomputer generates at its terminal P 12 a sample hold command signal which sets the duration of the sample holding operation by the sample hold circuit 158. Thus the voltage fluctuation and dark output components are eliminated from the picture element signals. The picture element signals from subtraction circuit 160 are amplified by amplifying circuit 162 at an amplifying rate corresponding to the brightness level.

The amplifying rate is controlled in such a way that the lower the brightness level, the higher the amplifying rate. The brightness level is detected by brightness level detecting circuit 164 from the inclined voltage from terminal q2 as an amount of change in a certain specified time of the inclined voltage and this amount of change is used as a signal indicating the brightness level. The amplified picture element signals are fed via multiplexor 166 to input 170 of voltage comparison circuit 168 which constitutes the digitalizing circuit. The digitalizing circuit comprises a voltage comparison circuit 168, a digital-analog conversion circuit 172 and a microcomputer 146 which provides 8-bit binary digit to D/A conversion circuit 172 and is programmed to store the comparison results. Thus, the digitalizing circuit is constituted as an A/D conversion circuit of sequential comparison type. The digitalized picture element signals are stored in the predetermined addresses of a random access memory in the microcomputer in accordance with picture element addresses Ri and Li.

Thereafter, the data processing is performed by the microcomputer in the manner as previously mentioned and the amount and direction of the defocus are detected to be used for the automatic focus control of the objective lens by driving device 30 and indication of the focus condition by display device 46.

Upon focus detection, when focus detection command switch 174 is closed, in response to this, microcomputer 146 will proceed to the initializing program for the CCD. At a stage before the focus detection is started, electric charge of the amount which is more than normal picture element signal level is stored on the transfer section and picture elements. This unwanted electric charge is cleared from the transfer section and picture elements before the picture element signals are derived. This clearing operation is the initialization of CCD. In this initializing process, clock pulses having a shorter period (for example, one sixteenth of normal ones for the transfer of the picture element signals) are given so that plural times of the transfer operations (for example, ten times) which are faster than normal case are repeatedly performed thereby clearing the transfer section. In this case, clearing of the electric charges stored in the picture elements is also carried out but the picture element signals deriving operations are not carried out. Transfer pulse generating circuit 144 generates the transfer pulses φ1, φ2 and φ3 using clock pulses having a certain fixed period and delivered from terminal P15 of microcomputer 146. The transfer pulses having a shorter period than normal ones are produced by changing the frequency dividing ratio of the clock pulses by the prescribed value inside transfer pulse generating circuit 144 in accordance with the "HIGH" voltage when flip-flop 176 is at a reset state and its output Q is at the "HIGH" voltage level. Flip-flop 176 is reset by the picture element charge clearing pulse from the microcomputer, and is set by the shift pulse. Also, the shift pulse also renders transfer pulse generating circuit 144 to generate normal transfer pulses. It will be noted that during the time period from the clear pulse generation to the shift pulse generation, i.e. the period defined as the charge integrating time for CCD 104, the transfer pulses having a shorter period than the normal ones are transmitted from transfer pulse generating circuit 144. With this respect, since the signals which are outputs via the transfer section from CCD 104 during the integrating period are treated as unnecessary signals, there will be no hindrance even if the transfer pulses become faster.

Now, when the transfer cycles of the prescribed number of times as the initializing operation have been completed, microcomputer 146 proceeds to a program for performing the previously described focus detection. First, when the clear pulse is output, CCD 104 starts the integration. Simultaneously, an inclined voltage which decreases from a prescribed voltage at a rate commensurate with the object brightness is generated from terminal q2 of CCD 104. When this voltage reaches a prescribed level Vs, the output level of voltage comparison circuit 148 is inverted from a "LOW" to a "HIGH" voltage level. This "HIGH" level voltage is used as an interrupt signal and when microcomputer 146 accepts the interruption, it delivers a shift pulse from terminal P16. The electric charge stored in each picture element of CCD 104 is shfited parallelly by the shift pulses to the transfer section, and then are serially transferred so that they are sequentially output as the voltage signal from output terminal q1. This voltage signals are digitalized in the previously described manner and are stored in the prescribed momories. When the storing of the picture element signals are completed, a "HIGH" level voltage signal is temporarily produced from terminal P11 of the microcomputer, and multiplexor 166, responding to the signal, selectively outputs a constant voltage from constant voltage circuit 178 accordingly. And this constant voltage is digitalized by digitalizing circuit 108 and is stored in the prescribed memory. As previously described, these data are used for correcting errors due to the fact that the distance between the two images formed at the basic section and the reference section does not have the value as designed due to the assembly error of the optical system and the like. Constant voltage circuit 178 comprises a constant current circuit 180 and a semi-fixed resistance 182, and it serves to set correct image distance data by adjusting semi-fixed resistance 182 in the adjusting process of the focus detecting apparatus.

Figure 15:
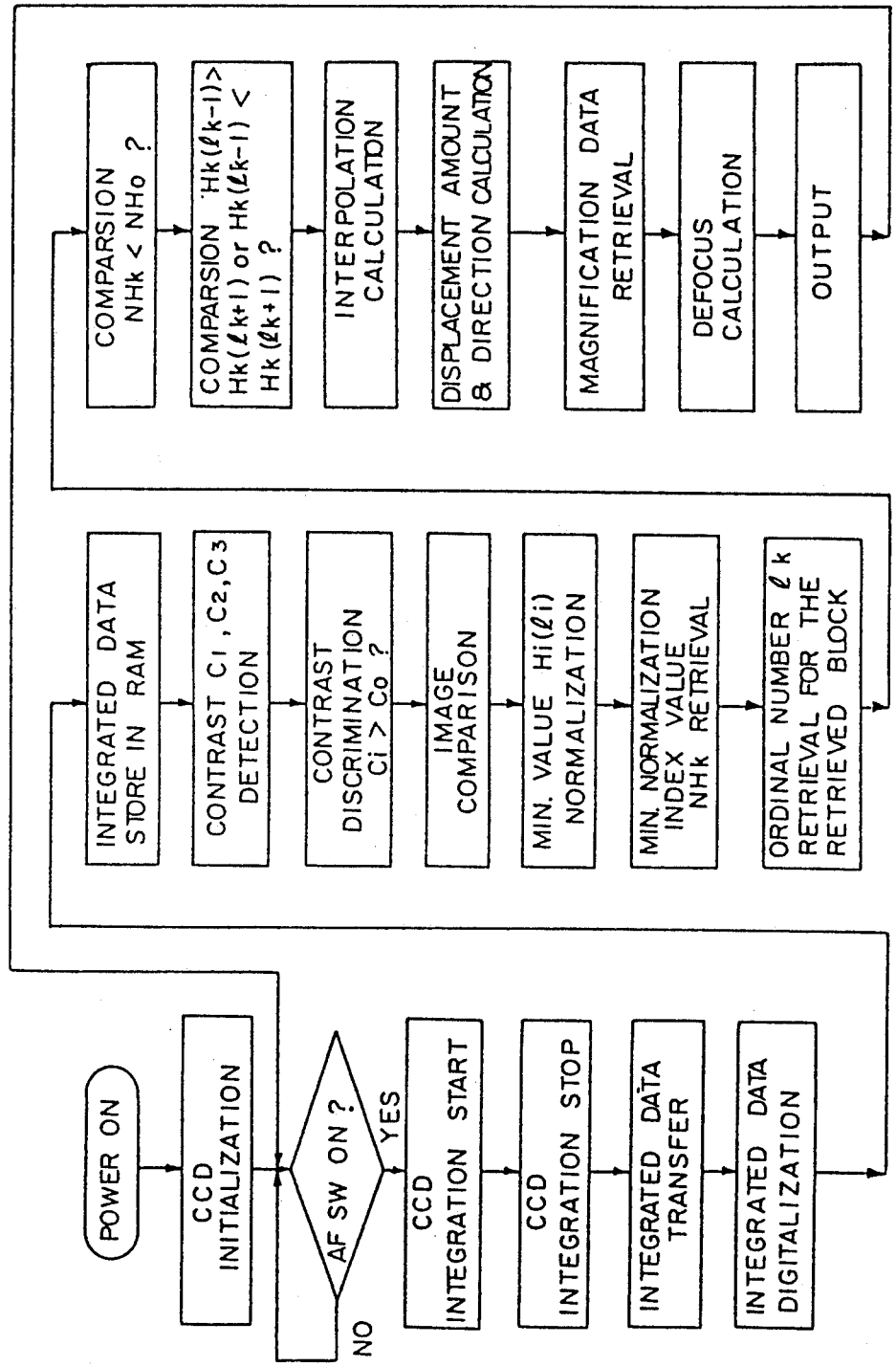
FIG. 15 is a flow chart showing the flow of operations, of the circuit shown in FIG. 14.

FIG. 15 is a flow chart showing the flow of operations of the focus detecting apparatus as previously described. The first embodiment so far described was designed to detect the focus condition based on the signals obtained by digitalizing the output of each cell of line sensors 62 and 64. On the other hand, the second embodiment as described below detects the focus condition based on the signals obtained by digitalizing the secondary output corresponding to the difference between the output of each cell of line sensors 62 and 64 and the output of the cells which are at a location shifted from the former cells by the prescribed number of cells. The reason for using such secondary output is described with reference to FIG. 16 and FIG. 18 before making an explanation of the second embodiment.

Figure 1:
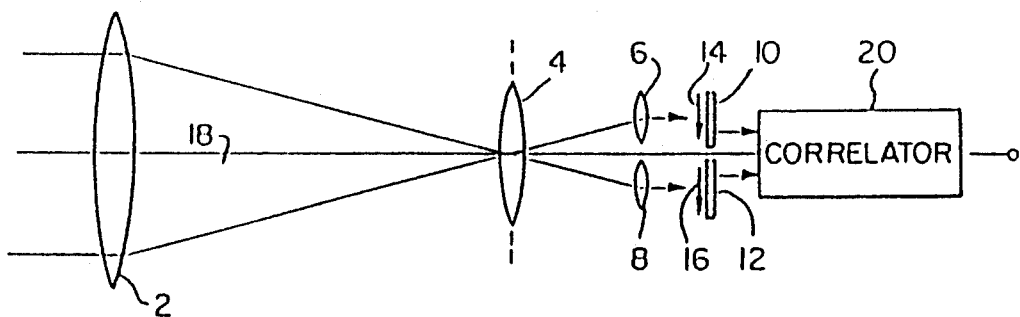
FIG. 1 is a schematic illustration of an optical system of a prior art focus detecting device.
Figure 16:
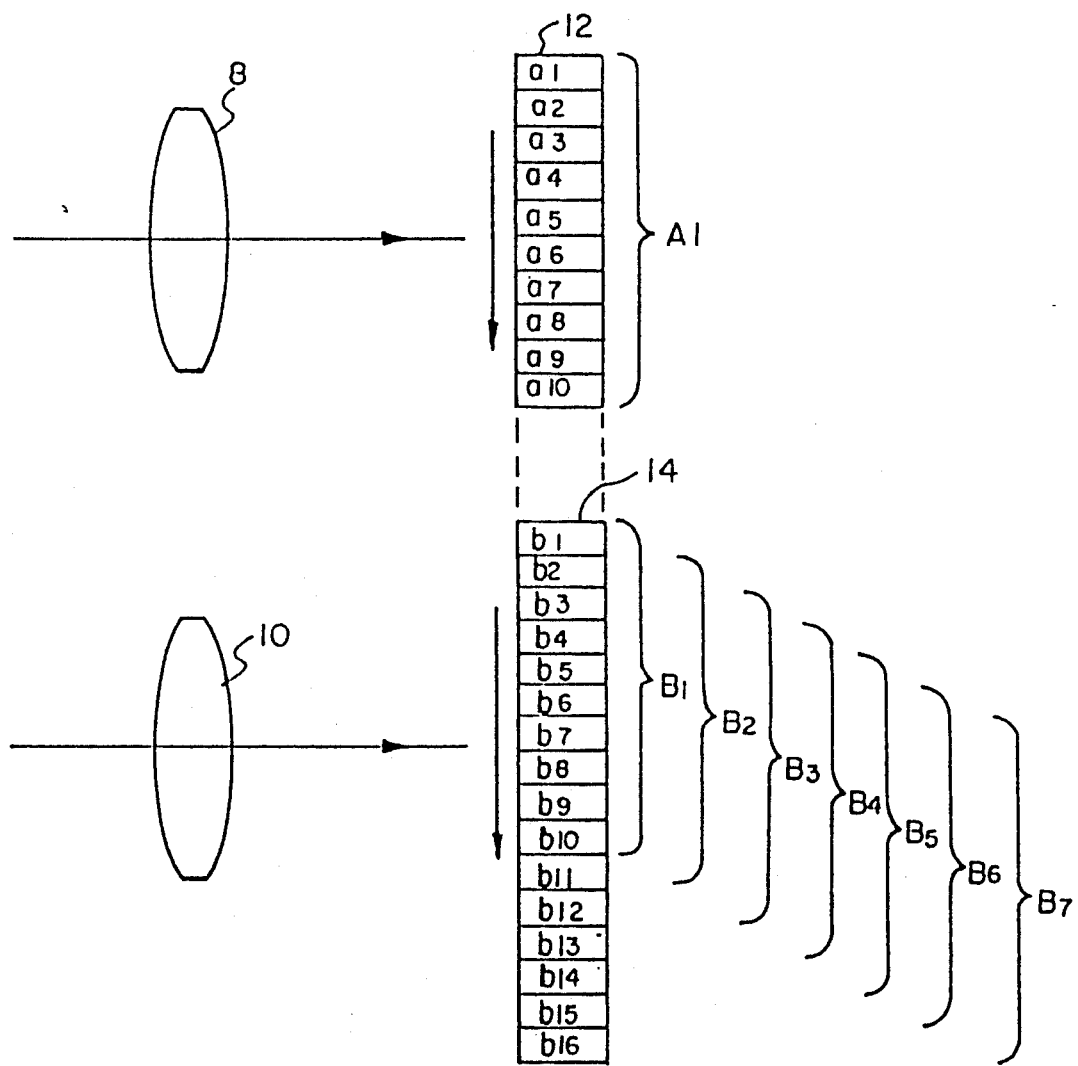
FIG. 16 is a schematic illustration of a prior art focus detecting device as shown in FIG. 7 but modified such that the line sensors consists of picture elements different in number.

FIG. 16 shows a case where each of image sensor 12 and 14 consist of ten and sixteen pieces of cells respectively for the simplification of the illustration in the known focus detecting device as shown in FIG. 1.

Namely, in FIG. 16, sensors 12 and 14 consists of, for example, ten and sixteen pieces of photodiode cells a1–a10, and b1–b16 respectively. Now, let's assume for the convenience that the reference characters assigned to each cell also represents the output of each cell. Here consider each of successive ten pieces of cells in sensor 14, then seven sets B1 to B7 will be taken as shown in the above diagram. The focus condition can be detected by detecting which one of the images on the seven sets most well coincides with the image on sensor 12. Now assuming that the image on sensor 12 coincides with the image on the set B1 in sensor 14. In other words, it is assumed that the relationships of a1=b1, a2=b2, ... and a10=b10 are established between each output of cell a1 to a10, and each output of cell b1 to b10. These relationships can be expressed by the following equation.

$$S1 = |a1 - b1| + |a2 - b2| + \ldots |a10 - b10| \quad (26)$$
$$= 0$$

Figure 17A:
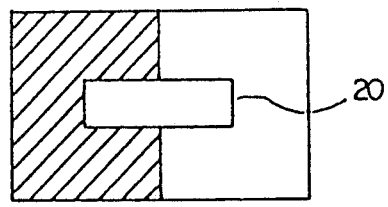
FIG. 17(a) is an illustration of an object to be focused on and having a stepwise brightness or tone patterns.
Figure 17B:
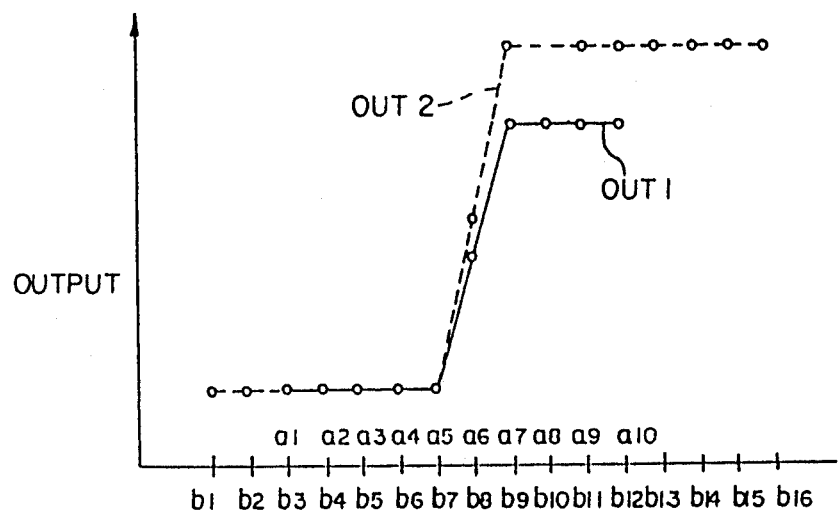
FIG. 17(b) shows graphs indicating the outputs of the line sensors shown in FIG. 16 for the object shown in FIG. 17(a)

S1 becomes smaller than the results of the similar calculation for the images on the sets other than the set B1, and the smallest of the calculated results for the images of all the sets. In order to find such a set that takes the minimum value, first, the computation as described above is performed. Next, an operation to find out the minimum value among the computated results are performed. The focus state detection has so far been performed in the previously described manner. However, the minimum value of the calculated values thus obtained corresponds to the case where the two images will most likely coincide together, only when the patterns of the two images are identical and the sensitivity of each pair of sensors are equal. When the identity of the images is not assured, or when the sensors have different sensitivity, the above minimum value does not necessarily correspond to the coinciding state of the two images, resulting in a focus detection error. The above relationships are described with reference to FIGS. 17(a) and 17(b). FIG. 17(a) shows an object to be focused on and having a stepwise brightness or tone patterns and the images of frame 20 are assumed to be formed on two sensors 12 and 14. Solid line (out 1) and dot line (out 2) in FIG. 17(b) are graphs indicating the outputs of sensors 12 and 14 for the object to be detected as shown in FIG. 17(a). As shown in the above graphs, let's consider a case where the two outputs are not identical but the difference arises between the outputs at the part corresponding to the bright part of the object to be detected. It will be noted that the graph shows a case where the image on sensor 12 coincides with the image for the third set B3 of sensor 14 and those two outputs are overlapped to each other in correspondence to the coincidence of the images. Now, if the two outputs (out 1) and (out 2) are identical to each other the value S3 calculated by the equation (27) below becomes zero and then smallest of the all including the other aggregated amounts.

$$S3 = \sum_{i=1}^{10} |a1 - b1 + 2| \quad (27)$$

However, when the both are not identical as shown in the above graphs, the calculated value S3 will not become the smallest but rather the value S2 obtained when shifting the graph of output (out 1) to the left by one cell pitch will be smaller. Namely, a detecting error of one pitch may occur. Now, assuming one pitch corresponds to 30μ, the detecting error corresponding to one pitch becomes approximately 1 mm in terms of the detecting error in the optical axis direction of a picture taking lens. The amount of such error may be sufficient to cause a hindrance in the practical use of single reflex lens camera.

On the other hand, the optical system associated with the focus detecting apparatus in accordance with the present invention is, as shown in FIG. 4, formed such that the two images formed on the upper and lower sensors will be non-symmertical with respect to the optical axis (see the direction of the arrows annexed to the images) and this fact may lead to a spoiling of the identity of the two images. Further, the aberration characteristics of the condenser lens and the secondary image forming lenses cause an image curvature also resulting in the spoiling of the identity of images. Although the curvature of image can be improved by employing non-spherical lens for the condenser lens and by using the combination of plural lenses but the improvement is not yet achieved to a satisfactory level. In addition, there are problems with the construction and arrangement of two secondary image forming optical systems to be sufficiently symmetrical with respect to the optical axis of the picture taking lens and this may also result in the non-identity of the two images. Thus, due to the various reasons so far described it is unavoidable that the two images or the output patterns for the images do not become identical. Accordingly, when using the conventional image comparison method, the focus detection error may be unavoidable.

Figure 18:
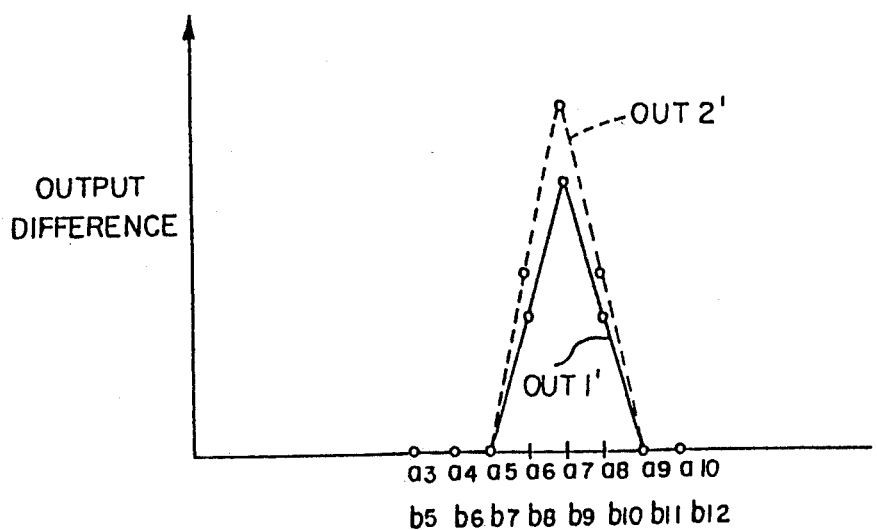
FIG. 18 shows graphs indicating the secondary outputs corresponding to the difference between the outputs of the line sensors shown in FIG. 16 themselves and those shifted by a unit of two picture element outputs.

In order to eliminate such shortcoming, the second embodiment of the present invention uses the above secondary output. Output out 1' shown in FIG. 18 is obtained by shifting output out 1 to the right by two pitches and subtracting the shifted output amount from output out 1 which is the output before shifted. Output out 2' is obtained from out 2 in the similar manner. In FIG. 18, the two outputs, i.e., out 1' and out 2' are shown corresponding to the state in which the two images overlap each other as well as FIG. 17(b). If a calculation is performed for such two outputs as was done for the outputs in FIG. 17(b), the minimum value (referred to as S3') may be obtained for the combination of the outputs as shown in FIG. 18. If it is supposed that output out 1' is shifted to the right by one pitch and the value S2' is calculated, it is easy to find out that the result will be S2'>S3'. It should be noted that in the case of FIG. 17(b), instead of S3 being the minimum, the relationship of S2<S3 was established resulting in an focus detection error. As seen from the above, if the secondary output as shown in FIG. 18 is used, the accuracy in the focus detection can be improved. The reason for this improvement is considered to be due to the fact that, the DC component included in the original signal and being the basis for causing the error is suppressed and the AC component which are effective for comparison are intensified.

Figure 19:
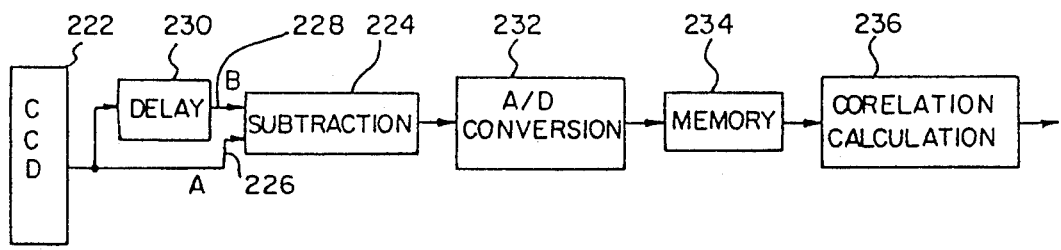
FIG. 19 is a block diagram showing another embodiment of the signal processing circuitry of the focus detecting device according to the present invention.
Figure 21:
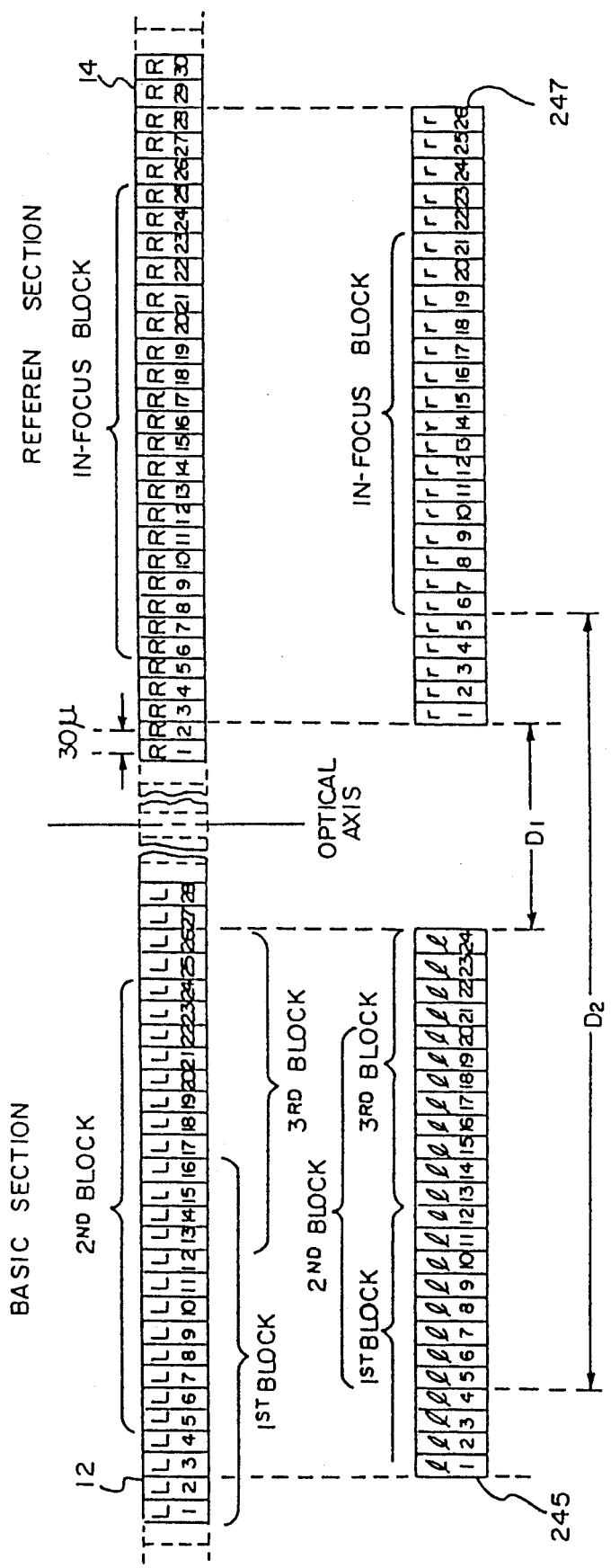
FIG. 21 is an illustration of an exemplary arrangement of picture elements of the line sensors used in the embodiment shown in FIG. 19 and their correspondence to the secondary outputs.

Next, FIG. 19 is a block diagram showing the second embodiment of the present invention in which a CCD (charge coupled device) is used as a sensor. It will be noted that a single CCD formed on the same chip is used for the sensors detecting the two separated images such that the output of each cell on the CCD is seqentially delivered, and necessary outputs of the delivered ones are selectively taken. In FIG. 21, of the cells of CCD 222 reference characters L1 to L28, and R2 to R30 are assigned to the cells of which outputs are to be used. Here, cells L1-L28 and R1-R30, for example, correspond respectively to sensors 62 and 64 in FIG. 3. It will be noted that the reference characters given to each cell also indicates the output of each cell. Also, hereafter, the cells L1-L28 and R1-R30 are called the basic section and reference section respectively. Now, for example, the integrated outputs are delivered from CCD 222 in the order of L1-L28, and R1-R30. In practice, cells that are not used, exist on the left side of output L1, between output L28 and R1 and on the right side of output R30. Now returning to FIG. 19, the output of the CCD thus delivered will be fed directly to input 226 of subtraction circuit 224 and also to another input 228 of subtraction circuit 224 via delay circuit 230. Delay circuit 230 may, for example, be formed by CCD and delays the output for a time corresponding to the output delivery time of four picture elements. Subtraction circuit 224 subtracts input 228 signal Sd from input 226 signal Sn.

In FIG. 29(a) signals Sn and Sd associated with the basic section are shown and in FIG. 29(b), subtracted output (Sn−Sd) with respect to signals Sn and Sd in FIG. 29(b) is shown. The first subtracted output associated with the basic section is shown by a formula of l1=L5−L1, and the last subtracted output is shown by a formula l24=L28−L24. Thus, when it is attempted to obtain subtracted outputs in combination with the outputs delayed by four-picture-element-output delivery time, the subtraction outputs of the number 24 which is less than 28 outputs by four can be obtained. The subtraction outputs for 26 cells can be obtained in the similar manner from the outputs for 30 cells from the reference section. Those subtraction outputs are sequentially converted into the digital values by Analog/Digital conversion circuit 232 and then, are stored in memory 234. When all the subtraction outputs are obtained, the calculation for obtaining the amount of displacement of the objective lens is performed by correlation circuit 236 using the data stored in memory 234. The above subtracted outputs are called the secondary output and its waveforms are called the secondary image respectively.

Figure 20:
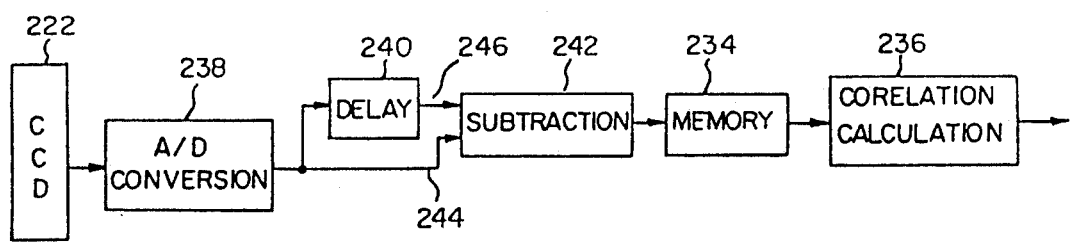
FIG. 20 is a block diagram showing still another embodiment of the signal processing circuitry.

FIG. 20 is a block diagram showing a still another embodiment of the signal processing circuitry which is a modification of the previously described embodiment shown in FIG. 19. The integrated output from CCD 222 is first converted into a digital value by A/D conversion circuit 238 and then the converted digital value is directly delivered into the output 244 of subtraction circuit 242 and at the same time, is delivered into another output 246 of subtraction circuit 242 via delay circuit 240. The output from subtraction circuit 242 is stored in memory 234. It will be noted that although both delay circuit 240 and subtraction circuit 242 are composed of the digital circuit, they are intended to perform the same function as that of delay circuit 230 and subtraction circuit 228 respectively and the signal processing after memory 234 is the same as that in FIG. 19.

As described above, memory 234 stores twenty four secondary output li (i=1, 2, ... 24) produced from the cell outputs of the basic section and twenty six subraction output γi (i=1, 2, ... 24) produced from the cell outputs of the reference section. It should be noted that the memory address for storing each secondary output is predetermined. Here, for the convenience of the signal processings thereafter, as shown in FIG. 21 each secondary output of li and γ2 is assumed to correspond to the cells of the basic section and the reference section respectively. For example, although the second output l1 is obtained by subtracting the cell output L5 from the cell output L1 in the basic section, this is assumed to the signal representing cell L3 which is positioned at the middle between cell L1 and cell L5. Hereafter, the rest of second outputs such as l2, l3 ... l24 and γ1, γ2 ... γ26 are considered in the similar manner and each signal is assumed to be the signals representing cells L4, L5, ... L26 and R3, R4 ... R28 respectively.

Next, let's consider the row of second outputs 245 for the basic section as being divided into three signal blocks of the first, second and third blocks as shown in FIG. 21. The first block includes the part of secondary output l1 to l12, the end block includes the part of secondary outputs (l5-l20) and the third block includes the part of secondary outputs (l13-l24). Each of these three signal blocks corresponds to the image in the respectively cells parts L1-L16, L5-L24 and L13-L28 on the line sensor. Upon detection of the amount of displacement, the pattern comparison operations as shown in FIG. 16 are performed for each of the three blocks. In FIG. 16, the basic patterns Al consisting of ten cell outputs are compared with the reference section consisting of sixteen cells outputs in 7 ways. Although it is possible to increase the numbers of comparison more than the above numbers, in such case, the numbers of the cell outputs to be compared with each other may be less than ten. In the focus detection apparatus according to the present invention, the comparison shall be performed with the numbers of signals constituting the basic patterns being determined constant.

Figure 22A:
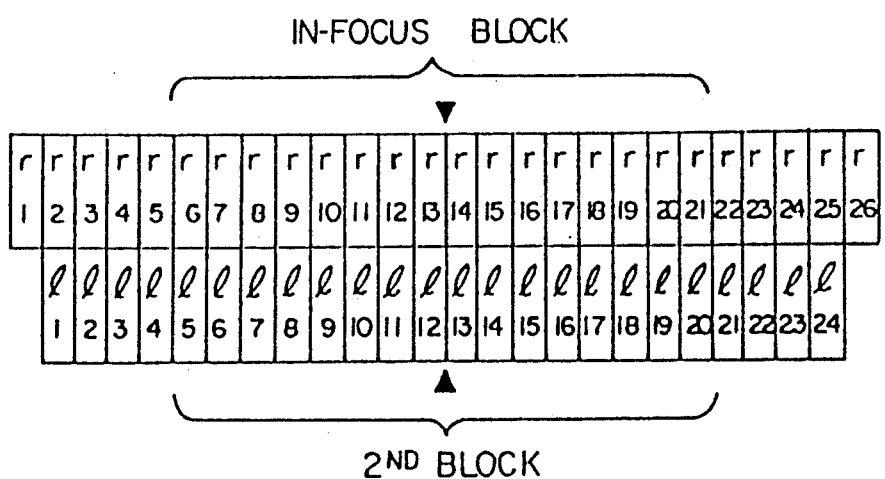
FIGS. 22(a), 22(b), 22(c) and 22(d) are illustrations of the secondary outputs of the basic and reference sections shown in FIG. 21, at different focus conditions, respectively.
Figure 22B:
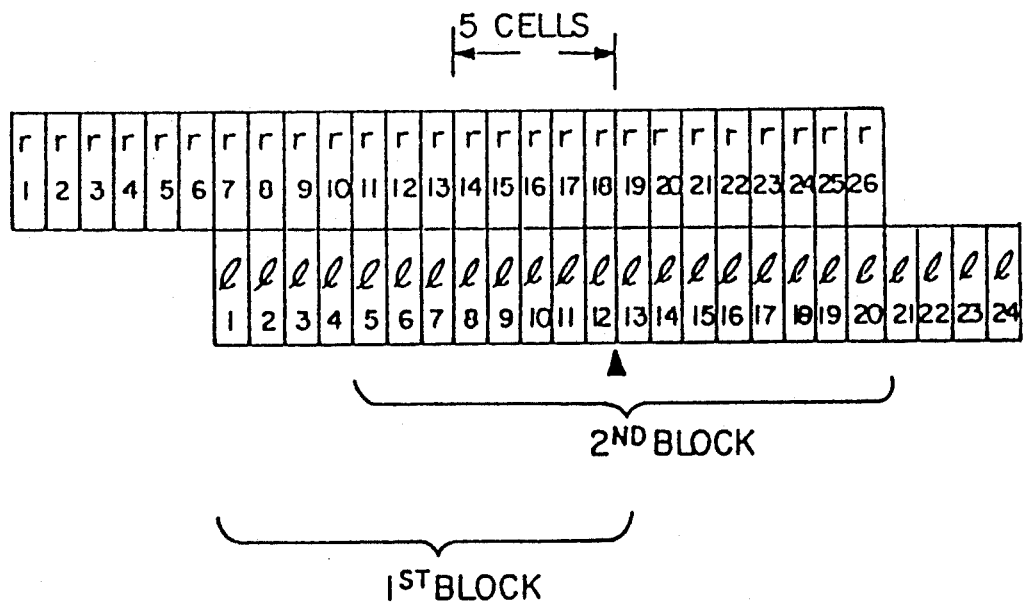
Figure 22C:
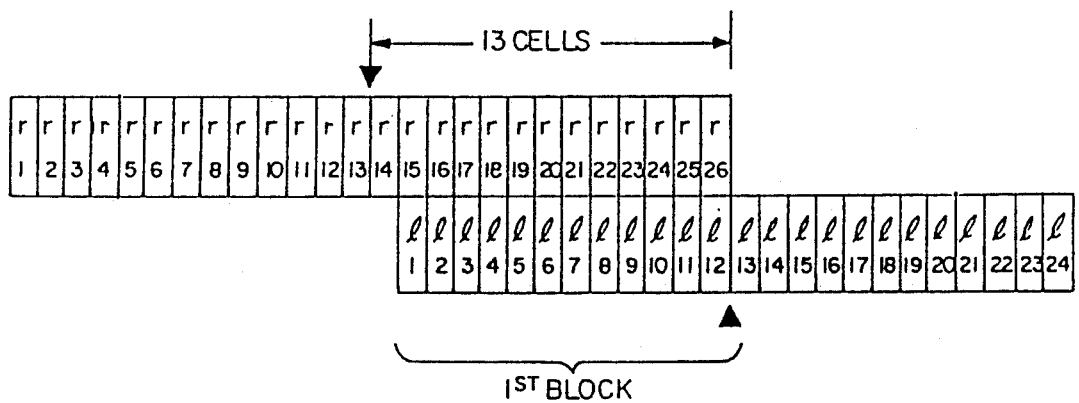
Figure 22D:
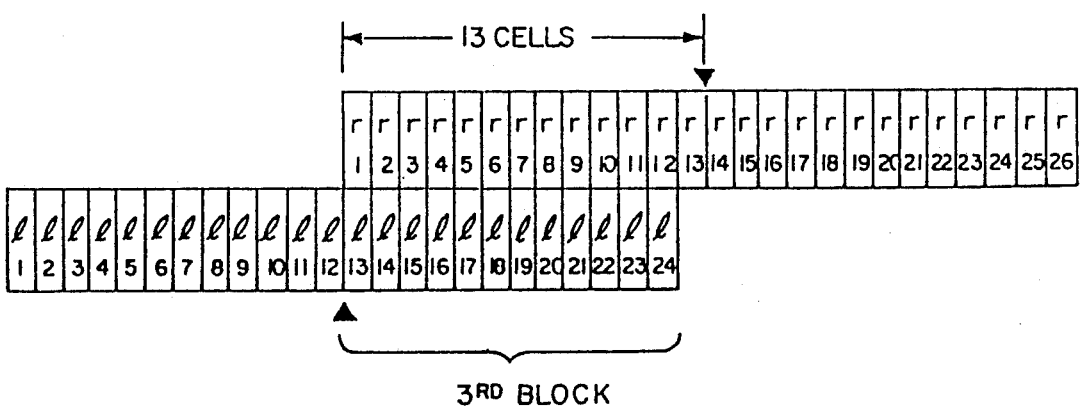
Figure 23:
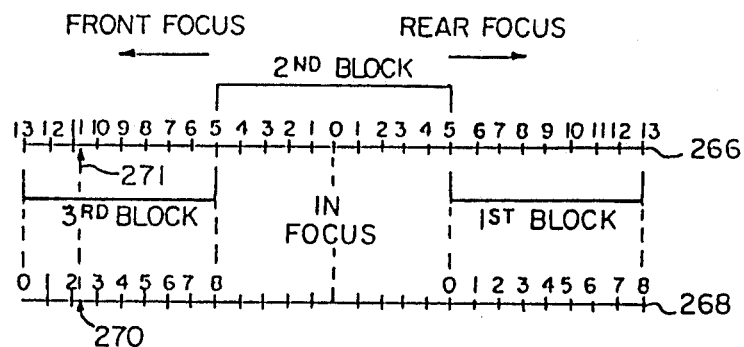
FIG. 23 shows numeral lines indicating shift positions of the first to third blocks, each consisting of a predetermined number of the secondary outputs of the basic section as shown in FIG. 21.

Now, returning to FIG. 21, since there are 12 secondary outputs in the first and third block, and 26 secondary outputs in reference section 14, each of the first and the third blocks is capable of performing the comparisons in 15 ways. Also, since there are 16 second outputs in the second block, comparisons in 11 ways are possible. Now, referring to FIG. 4, two images by formed secondary image forming lenses 54 and 56 lies near optical axis 48 in the front focus condition and they are off from optical axis 48 in the rear focus condition. At an in-focus condition or an approximately in-focus condition, the two images are located in the middle of the front and the rear focus positions. Accordingly, the first block is used for detecting the amount of displacement when the degree of rear focus is large, the second block is used for detecting the amount of displacement at an in-focus condition or in the vicinity of the in-focus condition, and the third block is used for detecting the amount of displacement when the degree of front focus is large. Now it is assumed that, as a standard for the design, the construction of the optical system are determined such that an in-focus condition is attained when the part (termed focus block) $\gamma 6-\gamma 21$ of the second outputs coincides with that of reference section 16. FIG. 22(a) shows a state where the second block is compared with the focus block. FIG. 22(b) shows a state where the second block is shifted to the right by five cells. By so shifting to the right, the comparison of five ways can be obtained. When shifting more than five, a part of the second block may sometimes be in an out of alignment state with the reference section. Accordingly, the comparison with the second block being shifted to the right is performed up to the state shown in FIG. 22(b). When comparison with the shifting further to the right is made, the first block is used. In the condition as illustrated in FIG. 22(b), the first block is arranged to oppose the part ($\gamma 7-\gamma 18$) of the second output of the reference section. This state is termed "five-right-shifting state" and corresponds to the ultimate right-shifting state for the second block, and to the starting state for the right shifting of the first block. The first block starts from this "five-right-shifting state" and performs the comparisons in 9 ways up to the shifting to the right for thirteen 13 cells as shown in FIG. 22(c). It should be noted that the first block is capable of shifting to the left from the state in FIG. 22(b), and comparisons in 6 ways can be performed in the states other than the state in the diagram when this 6-way comparison is not adopted. In other words, the detection in this case is performed by the second block. In the same manner so far described, the second block can shift to the left by five cells from the state in FIG. 22(a) and comparison in five ways can be obtained. Thus a total of eleven comparisons including the state in FIG. 22(a) can be obtained by the second block. When a detection with the shifting further to the left is made, the third block is used. FIG. 22(d) shows the state where the third block is shifted to the left by 13 cells. Likely as in the case of the first block, the comparison in nine ways from the "five-right-shifting condition" to the "thirteen-left-shifting" can be obtained for the third block. FIG. 23 shows the comparison areas assigned each block. In FIG. 23, the position of numeral zero on the numeral line 266 is assumed to express the comparison in FIG. 22(a). In the same way, the position of numeral 5 expresses the comparison in FIG. 22(b), and the position of numeral $-13$ expresses the comparison in FIG. 22(d). As seen from the above, in this embodiment, the displacement amount detection area extends the area in which each of the image on sensors 62 and 64 shifts to the opposite directions each other for a total shifting amount of 13 cells from the in-focus position as their starting position. Thus, if it is found out at what position the comparison results show the highest rate of coincidence on numeral line 266, namely, if the amount of shifting (termed $\Delta E$) of the two images are found out, the amount of displacement of the objective lens relative to the exposure plane can be obtained based on the equation (3). It will be noted that a half ($\Delta E/2$) of the total amount of shifting of the two images $\Delta E$ corresponds to the amount h of shifting in equation (3).

Now, the method for detecting the amount of displacement on the sensor is described in detail in the followings. It will be noted that for convenience, numeral line 268 is substituted for numeral line 266 in FIG. 23. For example, the numeral 0 on numeral line 268 corresponding to the numeral $-13$ on numeral line 266 is defined to express that the shift position of the third block is zero upon comparison of the third block with the reference section, from the view point of the signal processing in the circuit. Accordingly, for example, numeral 5 on numeral line 268 corresponding to numeral zero (shifting amount 0) on numeral line 266, expresses that the shift position of the second block is 5.

Figure 24:
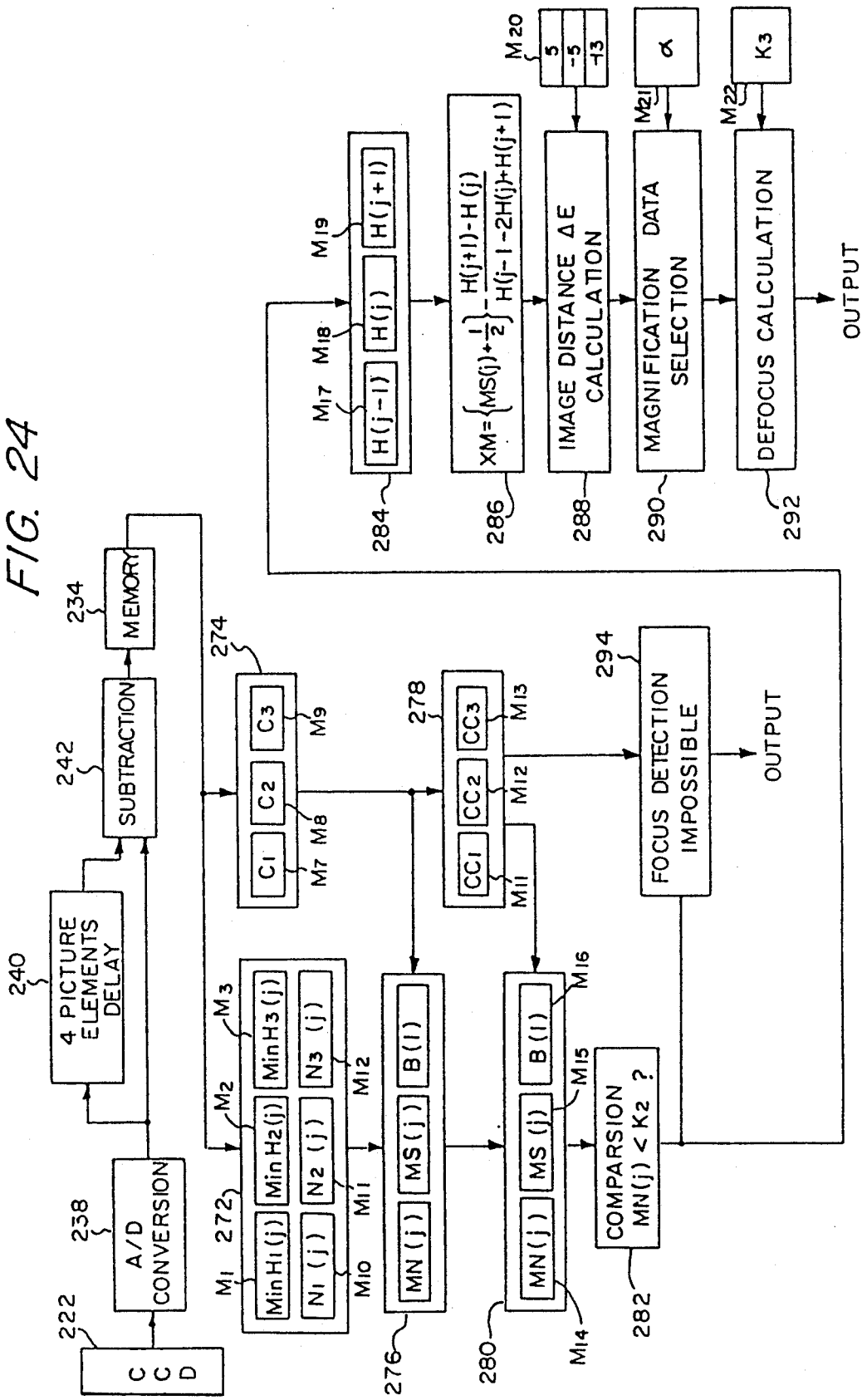
FIG. 24 is an exemplified block circuit diagram showing the whole construction of the signal processing circuit used for the embodiment shown in FIG. 20.

Next, circuit of FIG. 24 is described. In FIG. 24, the construction from CCD 222 to memory 234 is the same as that in FIG. 20. The second outputs l1-l24, and $\gamma 1-\gamma 26$ are stored in memory 234. Circuit block 272 compares each signal block corresponding to the basic section with that of the reference section and detects the shift position having the highest rate of coincidence at each block and the comparison output corresponding to this shift position. The contents of this comparison output will be described below. First, the comparison operations using the first block are described. The first block is, as previously described, composed of the signals of the secondary outputs l1-l12 and they are compared with the secondary outputs $\gamma 7-\gamma 26$ of the reference section in 9 ways. The first in the 9-way comparisons is the comparison of contents between the block of the secondary outputs l1-l12 112 and the block of the secondary outputs $\gamma 7-\gamma 18$ as shown by the following equation:

$$H1(0) = \sum_{k=1}^{12} |l^k - \gamma^{k+6}| \tag{28}$$

This corresponds to the shift position zero of the first block on the numeral line 266 in FIG. 23. Next, the content of the second comparison are expressed by the following equation.

$$H1(1) = \sum_{k=1}^{12} |l^k - \gamma^{k+7}| \tag{29}$$

This corresponds to the shift position 1 of the first block. Thereafter, the comparisons corresponding to each shift position 3, 4, ... 8 of the first block will be performed in the same manner. The comparison contents corresponding to the shift position j(j=0, 1, 2, ... 8) of the first block can be expressed by the general equation below.

$$H1(j) = \sum_{k=1}^{12} |lk - \gamma k + 6 + j| \quad (30)$$

The calculated values H1(j) which can be obtained by the 9-way comparisons so far described is termed as comparison output. Assuming that the minimum of these 9 comparison outputs corresponds to the highest rate of coincidence in the comparison related to the first block and this is expressed by mini H1(j), and the shift position corresponding to it is expressed as S1(j). The detection of this minH1(j) is made, for example, in the manner that, when first, H1(0) is detected at first and, the, H1(1) is detected, both are compared with each other to select the smaller one. Thereafter, when H1(2) is calculated, it is compared with the previously selected one of H1(0) and H1(1) and the smaller one is selected. Then the same operation is proceeded with. By so doing, when H1(8) is calculated compared with the minimum in the preceeding comparisons, the minH1(j) is determined. On the other hand, S1(j) is detected in the following manner. For example, if there are provided a counter which is at first set to zero and incremented by one when the comparison output is calculated, and a register which takes in the contents of above counter when the newly calculated output is smaller in the comparison of the two comparison outputs, S1(j) can be obtained at the register when the final comparison output H1(8) of the first block is compared with the previously selected comparison output. The register should be set to zero at the initial stage.

Next, the comparison for the second block expressed by the equation below shall be performed for detecting minH2(j) and S2(j).

$$H2(j) = \sum_{k=1}^{16} |lk + 4 - \gamma k + j| \quad (31)$$

In the second block, j is an integer from 0 to 10. Here, H2(0) is a comparison output obtained by comparing the second output l5-l20 with the second output γ1-γ16, and corresponds to the shift position of zero of the second block. Similarly, comparison for the third block shall be performed in a manner as expressed by the equation below for detecting minH3(j) and S3(j).

$$H3(j) = \sum_{k=1}^{9} |lk + 12 - \gamma k + j| \quad (32)$$

In this case j is an integer from 0 to 8. Here, H3(0) shows the comparison result in the case illustrated in FIG. 22(d) and also indicates the shift position of zero of the third block as illustrated in FIG. 23. Detected values minH1(j), minH2(j), minH3(j), S1(j), S2(j) and S3(j) for each block are stored in memories (M1), (M2), (M3), (M4), and (M6) respectively.

Next, circuit block 274 calculates the contrast signal which is defined as below, by using the second output data from memory 234. It will be noted that generally, the contrast of image is defined as showing the difference in the brightness of image in the two different specific areas. For example, the difference in the output of the adjacent cells is used as a signal showing the contrast. On the other hand, the present embodiment does not use the difference between the two cell outputs but detects the difference between the secondary outputs with the latter difference being termed as the contrast signal, used as a signal indicating the image contrast. It will be noted that although the difference between two cell outputs may be used as a contrast signal, in this embodiment, in order to save the number of memories, no memory is prepared for storing the output of each cell and the contrast signals which are obtained from the secondary output are used in substitution. Here, the reason why the substituted contrast signal may be used as indicating the image contrast will be selfexplanatory from FIG. 17(b) and FIG. 18. It should be noted that the contrast signal is necessary to know the case where the contrast of an object to be photographed is too low to detect the focusing. Thus, contrast signals C1, C2, C3 for each block can be obtained by the following equations at circuitry block 274.

$$C1 = \sum_{1}^{10} |lk - lk + 2| \quad (33)$$

$$C2 = \sum_{1}^{14} |lk + 4 - lk + 6| \quad (34)$$

$$C3 = \sum_{1}^{10} |lk + 12 - lk + 14| \quad (35)$$

Wherein C1 is total sum of the absolute values obtained by adding the differences between a secondary signal lk and the secondary signal lk+2 from the element next to the one adjacent to the element for lk, in ten ways with respect to the second output signals l1−l12 of the first block. It will be noted that the differences between the two outputs, lk and lk+1 of adjacent elements may be obtained but the detection of the difference for the pair at intervals by one will enable the detection of an emphasised difference and will provide advantage to the later processing. Then, C2 and C3 are the contrast signals for the second and the third block. C1, C2 and C3 are stored in memories M7, M8 and M9 respectively.

Circuit block 276 finds the ratios between the minimum comparison outputs minH1(j), minH2(j) and minH3(j) of each block obtained by circuit block 272 and contrast signals C1, C2 and C3 obtained by circuitry block 274 respectively as expressed by the following equations $$N1(j) = \frac{minH1(j)}{C1} \quad (36)$$

$$N2(j) = \frac{minH2(j)}{C2} \quad (37)$$

$$N3(j) = \frac{minH3(j)}{C3} \quad (38)$$

Here, although the minimum comparison outputs for the first block and the third block are computed by using twelve comparison outputs l1-l12 and l13-l24 respectively but sixteen comparison outputs l5-l20 are used for computing the minimum comparison output. Accordingly, the minimum comparison output of the first or the third block for the same image does not become identical with the minimum output of the second block, and the minimum comparison output of the second block having more signals to be compared with each other may become larger than that of the first and third block. Thus, it is not proper to compare three comparison outputs with each other assuming that they are equivalent for the purpose of detecting which one of three minimum comparison outputs may show the shift position having the highest rate of coincidence. On the other hand, of the contrast signals C1, C2 and C3, signal C2 may become larger than C1 or C3 for the same image. Accordingly, by taking the ratios obtained by the above equations, it is assumed that the three minimum comparison outputs are converted into the informations on an equal basis with N1(j), N2(j) and N3(j) as their individual propensities. It will be noted that those ratios obtained are termed as the normalized minimum values, which are also stored in memories M10, M11 and M12.

Next, circuit block 278 judges whether each of contrast signal C1, C2 and C3 is higher than the predetermined contrast judging level K1. If, for example, the contrast signal is higher than K1, a signal of logic "1" will be generated and "0" will be delivered vice versa. The judged results are termed CC1, CC2 and CC3 and are stored in memories M10, M11, and M12 respectively. When all of the three contrast signals do not reach the judging level K1, a signal indicating this fact may be issued from a circuit block 294. This signal is assumed to indicate the impossibility of the focus detection due to insufficient object contrast.

Figure 25:
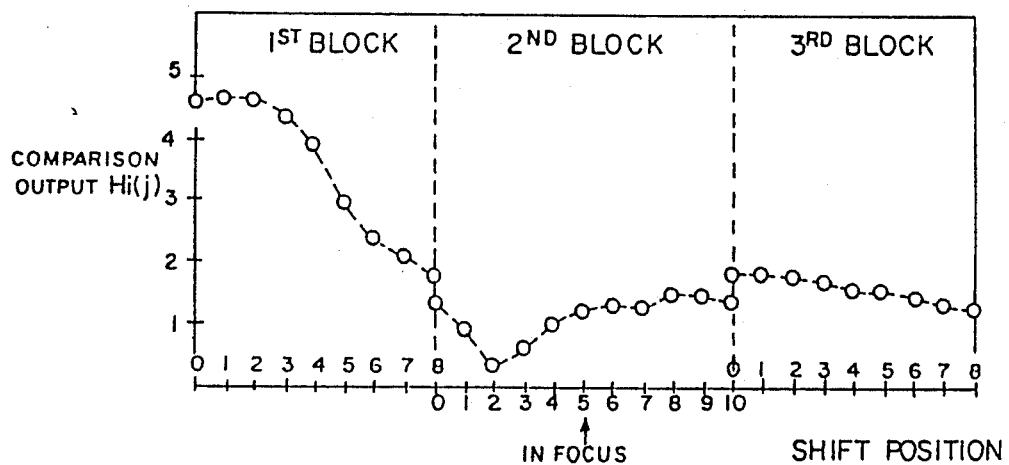
FIG. 25 shows a graph plotting comparison results Hi(j) for the first to third blocks.

Based on the judged results by circuit block 278, circuit block 280 selects in the following manner one of the three minimum normalized values obtained by circuitry block 276, as a signal showing the shift position which indicates the highest rate of coincidence. First, the minimum normalized value is eliminated which corresponds to the block that was judged to have insufficient contrast by the contrast judgement by circuitry block 278, the minimum normalized value of the rest of the blocks are taken as the object of the selection. When there is no block having insufficient contrast, the minimum normalized values N1(j), N2(j) and N3(j) of the three blocks are taken as the objects of the selection. The smallest one is selected from all the minimum normalized values that was left as the objects of selection and the selected one is determined as showing the highest rate of coincidence. In other works, it is determined which position on the numeral line 266 or 268 corresponds to a position where the images become coincident. It will be noted that where N1(j)=N2(j) having a greater reference numeral than the other attached after N should be selected. Assuming that the minimum normalized value thus selected is MN(j) and the corresponding shift position is MS(j). Both MN(j) and MS(j) are stored in memory M14 and M15 respectively, and the data B(i) showing the corresponding signal blocks are stored in memory M16. With the operations so far described, the shift position is detected at the cell arranging pitch unit. Now, where the pitch in the line of cells is 30μ and θ in the equation 3 is 2.8°, and the image magnification α is 0.3, the amount of shifting for one pitch may approximately 1 mmm in terms of the amount of the displacement of the image in the direction of the optical axis of the picture taking lens. Namely, the accuracy of detection may approximately 1 mm according to the above detection result. However, since the caliber of single reflex camera requires the accuracy of detection of approximately 50μ, the detection for the shift position at a resolving power less than one pitch is desired. FIG. 25 is a graph showing an example of comparison output corresponding to each shift position when the objective lens is positioned at a specified position, and in this case, the shift position 2 in the second block will be the coincident point.

Next, explanation will be made about circuit blocks provided for calculating the amount of displacement with improved accuracy by using the above detection results.

Circuit block 282 compares the minimum normalized value MN(j) obtained by circuitry block 280, with the predetermined limit value K2. Where MN(j)>K2, the focus detection is assumed to be impossible. However, at first, based on the shift position MS(j), the objective lens is adjusted. If, for example, it shows a rear focus, a control operation is performed to move forward the objective lens and then the focus detection operation is performed again from the CCD data collection. It should be noted that the value K2 should be set on an experimental basis.

Circuit block 284 obtains the comparison outputs H(j−1), H(j) and H(J+1) by using the second output of memory 234 with respect to each of three shift positions including MS(j) corresponding to the minimum normalized value MN(j) obtained by circuit block 280 and the positions S(j−1) and S(j+1) which are 1 bit before and behind the shift position MS(j). It will be noted that these three comparison outputs as well as other comparison outputs are calculated by circuit block 272 but in order to save the number of memories in the system, outputs other than the minimum comparison output of each signal block are abandoned. When the memory has enough capacity, the system can be constructed such that all the comparison outputs calculated by circuit block 272 are stored in the memory and comparison outputs corresponding to this shift position and the ones before and behind this shift position are read out from the memory when the shift position MS(J) is obtained. If the shift position obtained corresponds to the shift position 6 of the first block, circuit block 284 can find the comparison outputs H1(5), H1(6) and H1(7) for the shift positions 5, 6 and 7 respectively. It will be noted that, when the shift positions at the both end of the signal block correspond to MS(j), for example, when the shift position of the first block is zero, this position shall be regarded as the coincident position for the two images thereby cancelling the calculation by the circuit block.

Circuit block 286 calculates coincidence position for the two images, utilizing the three outputs obtained by circuit block 284. Shift position MS(j) obtained by circuit block 280 does not necessarily indicate a real coincident point. This is due to the fact that the comparison of two images must be performed stepwise for each unit of the pitch in the arrangement of the cells while the two images have continuous distribution. Now, in order to understand the method of calculating the coincident point, the relationships between the three comparison outputs and the coincident points are reviewed referring to the graphs illustrated in FIGS. 6(a), 26(b), 26(c) and 26(d). FIG. 26 (a) shows a case where the two comparison outputs H(j−1) and H(j+1) are equal to each other and shift position j is considered to be a real coincident point. FIGS. 26 (b), 26(c) and 26(d) show the graphs wherein the same diagram as shown in FIG. 26 (a) are shifted by ¼ pitch, ½ pitch and ¾ pitch to the left respectively and these correspond to the cases where the real coincident points are shifted from SM(j) by ¼ pitch, ½ pitch and ¾ pitch respectively. FIGS. 26 (b) and 26(d) show that the real coincident point exists between the two shift positions corresponding to the minimum comparison output and the next to the minimum comparison output and at substantially near shift position SM(j). FIG. 26 (c) shows that when there are two minimum comparison outputs, the central point between those shift positions is the real coincident point.

Figure 27A:
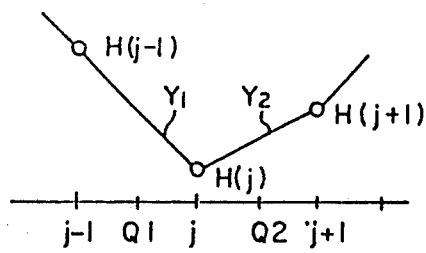
FIG. 27(a) shows a graph similar to that shown in FIG. 26(d)
Figure 27B:
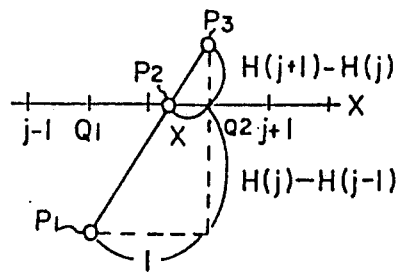
FIG. 27(b) is an explanatory illustration illustrating how the shift position providing best coincidence between the secondary outputs of the basic section and those of the reference section is calculated.
Figure 26A:
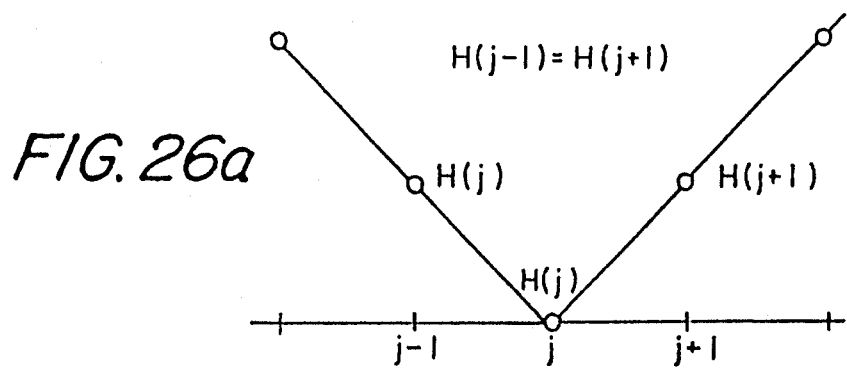
FIGS. 26(a), 26(b), 26(c) and 26(d) show graphs plotting the minimum comparison result H(j) together with the adjacent comparison results H(j+1) and H(j−1), wherein H(j−1)=H(j+1) in FIG. 26(a), H(j−1)<H(j+1) in FIG. 26(b), H(j−1)=H(j) or H(j)=H(j+1) in FIG. 26(c) and H(j−1)>H(j+1) in FIG. 26(d), respectively.
Figure 26B:
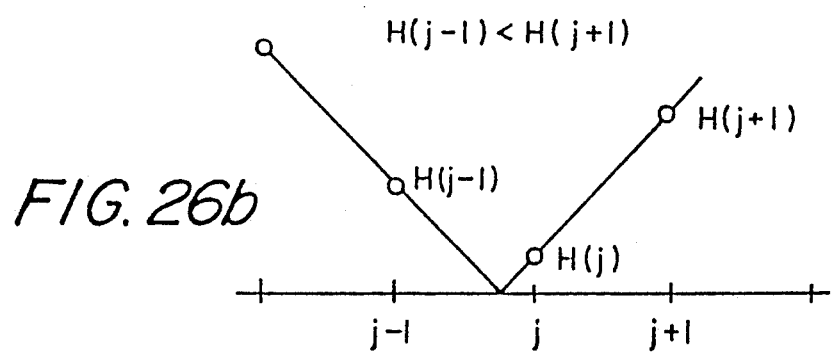
Figure 26C:
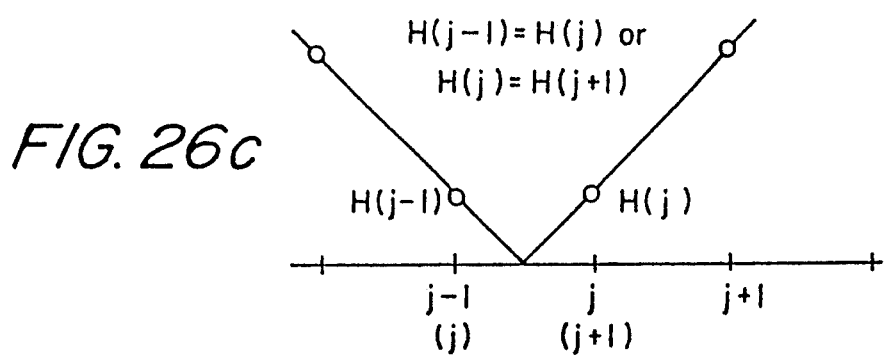
Figure 26D:
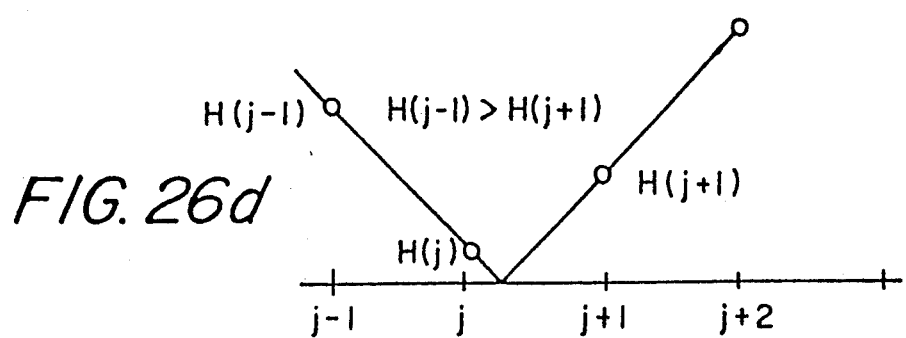

The formulae for finding such a coincident position is described as follows. Now, as an example, consider the case as illustrated in FIG. 27(a). This corresponds to a case as shown in FIG. 26(d). Consider H(j)−H(j−1) which is the difference between the minimum comparison output H(j) and its adjacent comparison output H(j−1), and H(j+1)−H(j) which is the difference between the minimum comparison output H(i) and another adjacent comparison output H(j+1), and assume that each of them indicates the inclination of Y1 and Y2 at the central points Q1 and Q2 between the shift positions j−1 and j and between and J+1 respectively. In FIG. 26(b), the inclination based on the above assumption are plotted as the points P1 and P3. Next, consider the line portion P1-P3 and assume the cross point P2 where the above line portion P1-P3 and horizontal axis intersect to be a real coincident point. Thus find the distance x between the point Q2 and the point P2 is found. It should be noted that the pitch of the cells is taken as the the unit of distance and assumed to be one unit. The distance x is expressed by the following equation.

$$x = \frac{H(j+1) - H(j)}{H(J-1) - 2H(j) + H(j+1)} \quad (39)$$

Accordingly, the position XM of the point P2 can be expressed by the following equation.

$$XM = MS(j) + \frac{1}{2} - x \quad (40)$$

$$= MS(j) + \frac{1}{2} - \frac{H(j+1) - H(j)}{H(j-1) - 2H(j) + H(j+1)}$$

This equation (40) may also be applicable to the cases different from the one shown in FIG. 27(a). Accordingly, circuit block 286 calculate the real coincident point XM by performing the calculation based on the equation (40). The coincident point thus obtained may belong to one of the three signal blocks corresponding to the one point on numeral line 268. For example, it expresses the shift position 2.20 of the third block indicated by arrow mark 270. Also, this shift position 2.20 may have the position of the numerical value −10.80 (=−13+2.20) indicated by arrow mark 271 on numeral line 266. This indicates that the two images in the basic section and the reference section have approached each other by 10.80 pitches as compared with the state in the focus condition on the sensor, namely, the shifted amount ΔE toward the front focus state is 10.80. Thus when one point on numeral line 268 is determined, the point corresponding to it on numeral point 266, namely, the amount ΔE of shifting is also determined. Circuitry block 288 determines this amount ΔE of shifting. Referring to FIG. 22, the amount ΔE of shifting corresponding to the shift position XM with respect to the first block is, $$\Delta E = XM + 5 \quad (41)$$

The amount ΔE of shifting corresponding to the shift position XM with respect to the second block is, $$\Delta E = XM - 5 \quad (42)$$

And the amount ΔE of shifting with respect to the third block is, $$\Delta E = XM - 13 \quad (43)$$

It should be noted that as previously mentioned, a half of this amount ΔE of shifting corresponds to the amount h of shifting. Circuit block 288 performs the calculation for one of the equations 41, 42 and 43, based on the information for the shift position XM from circuit block 286 and the information for the signal blocks stored in memory 16 of circuit block 280. The shift amount ΔE thus obtained is computed on the basis of the unit of the pitch in the arrangement of the cells.

The next circuit block 290 determines the image magnification o included in the equation (3) according to the value ΔE. As previously described, since α is an amount which varies in proportion to the amount h of shifting, the relationship between α and h is experimentally determined at the designing stage, and α corresponding to ΔE is provided in memory 291 accordingly. In this case, ΔE is divided into plural ranges, and a plurality of α corresponding to these divided ranges are provided. Circuit block 290 judges to which the divided range the value ΔE belongs, then α is read out from the memory corresponding to this divided range thereby delivering an output to circuit block at the next stage.

Circuit block 292 calculates the amount e of the defocus utilizing the above information. Here, if the length of one pitch in the cell arrangement is assumed to be P, the amount h of shifting will be ΔE·P/2. Accordingly, the equation (3) is expressed as the follows:

$$e = \frac{\Delta E \cdot P}{2\alpha \tan\theta} \quad (44)$$

$$= K3 \cdot \frac{\Delta E}{\alpha}$$

Wherein K3 is a constant corresponding to P/2 tanθ, and is prepared in memory M22 in advance. Since ΔE has a positive sign in rear focus condition and a negative sizn in the front focus condition, equation (44) indicates not only the amount of defocus but also the direction of defocus. Thus, circuit block 292 computes the amount and direction of defocus in accordance with equation (44).

FIG. 28 is a block diagram showing the circuit construction of the focus detecting device utilizing a microcomputer in accordance with the preferred embodiment of the present invention as illustrated in FIG. 24. In FIG. 28, microcomputer 296 is of a common type of 8-bit, one chip microcomputer (for example, type 6502 manufactured by Motorola) with increased memory capacity. When utilizing a microcomputer, part of the composition of A/D conversion circuit 238 of circuitry blocks shown in FIG. 24 and its latter part are composed of microcomputer 296. An A/D conversion circuit 239, a switch 298 for controlling the focussing operation, a CCD driving circuit 30, a motor driving circuit 302, and a display circuit 308, etc. are externally connected to microcomputer 296. A/D conversion circuit 239 includes a voltage comparison circuit and a D/A conversion circuit. During the period of A/D conversion A/D conversion circuit 239 receives digital codes which vary in time from microcomputer 296. And it compares the analog voltage corresponding to the above digital codes with the cell outputs from CCD 222, and determines the digital code when they both reach the prescribed relationships as a signal value obtained by achieving A/D conversion.

CCD driving circuit 300 produces control signals which are ncessary for driving and controlling CCD 222, from the clock pulses supplied from microcomputer 296. Motor driving circuit 302 controls the power supply to lens driving motor 304 for driving objective lens 306 toward an in-focus position based on the defocus amount and direction signal detected. Display circuit 308 display the indication of front focus, in-focus, and rear focus states, impossibility of focusing, etc., inside the view finder field, based on the defocus amount and direction signal and the signal indicating that any of the contrast signals CC1, CC2, and CC3 below the level K1.

The focus detecting apparatus so far described repeats the operations for detecting the previously described amount and direction of defocus while switch 298 is being closed so that the objective lens is moved toward an in-focus position. It will be noted that although the various circuits such as a circuit which eliminates the dark output contents inherent to CCD, and the one which amplifies the output signals of each cell according to the object brightness are installed between CCD 222 and A/D conversion circuit 239, description of them is omitted since they are not directly related to the present invention. It is needless to say that the apparatus in practical use employs the various known techniques such as varying the integrating time for CCD according to the incident light rays intensity.

Figure 30A:
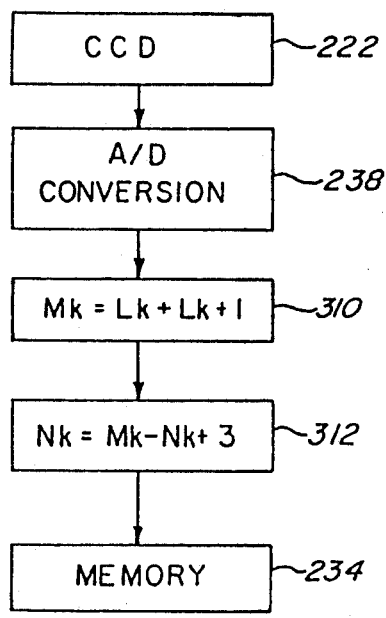
FIG. 30(a) and 30(b) are block diagrams showing modifications of the embodiment shown in FIG. 20, respectively.
Figure 30B:
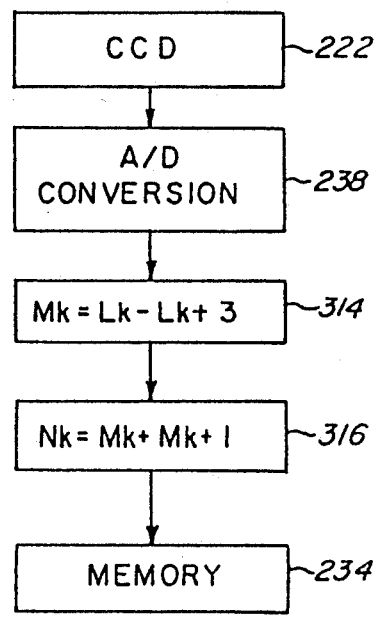
Figure 31A:
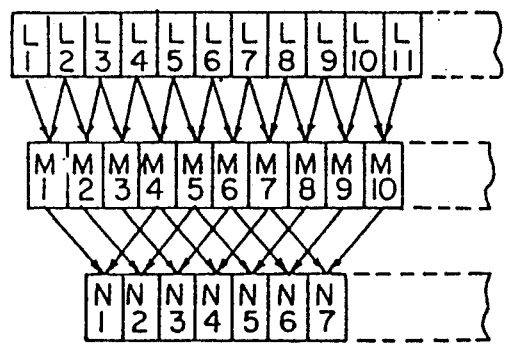
FIGS. 31(a) and 31(b) show the manner of the calculations Mk and Nk by the modifications shown in FIGS. 30(a) and 30(b), respectively.

FIGS. 30(a) and 30(b) are block diagrams showing two different modifications of the embodiment shown in FIG. 20. In the modification of FIG. 30(a), digitalized signals from A/D conversion circuit 238 are fed to a circuit block 310 which calculates $Mk = Lk + Lk + 1$, wherein Lk and $Lk + 1$ are digitalized signals obtained by the A/D conversion of the outputs from the kth and $(k + 1)$th picture elements belonging to the basic section of CCD 222, respectively. Circuit block 238 may include a delay circuit for delaying each digitalized signal from A/D conversion circuit 238 by one-picture-element-delivery time and an adder circuit which adds the digitalized signal $Lk + 1$ directly provided by A/D conversion circuit 238 to the digitalized signal Lk delayed by the delay circuit. The output signal of this circuit block 310 representing Mk is then fed to another circuit block 312 which calculates $= Mk - Mk + 3$. Circuit block 312 includes a delay circuit for delaying each output signal of circuit block 310 by three-picture-elements-delivery time and a subtracter which subtracts the output signal $Mk + 3$ directly provided by circuit block 310 from the output signal Mk delayed by the delay circuit. The output signal of circuit block 312 representing Nk is stored in memory 234 for signal processing by the successive stage circuit blocks shown in FIG. 24. FIG. 31(a) schematically illustrates the manner of the calculation of $Mk = Lk + Lk + 1$ by circuit block 310 and the manner of the calculation of $Nk = Mk - Mk + 3$ by circuit block 312. It is to be noted that similar calculations are made for the digitalized signals obtained by the A/D conversion of the outputs from the picture elements belonging to the reference section of CCD 222. It is also to be noted that high frequency components included in the intensity distribution of the two images on CCD 222 eliminated by the calculation at circuit block 310 which a DC component included in the intensity distribution of the images is eliminated by the calculation at circuit block 312. Therefore, the modification can carry out focus detection with higher accuracy.

Figure 31B:
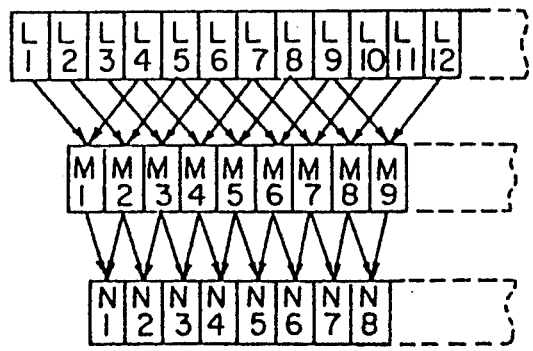

The modification shown in FIG. 30(b) can also carry out focus detection with higher accuracy. To this end it includes a circuit block 314 which calculates $Mk = Lk - Lk + 3$ and another circuit block 316 which calculates $Nk = Mk + Mk + 1$. The manner of these calculations are schematically illustrated in FIG. 31(b). Circuit block 314 may include a delay circuit for delaying each digitalized signal from A/D conversion circuit by three-picture-elements-delivery time and a subtractor which subtracts the digitalized signal $Lk + 3$ directly provided by the A/D conversion circuit from the digitalized signal Lk delayed by the delay circuit. As is similar to circuit block 312 shown in FIG. 30(a), this circuit block 314 serves to eliminate a DC component included in the intensity distribution of the two images on CCD 222. In contrast thereto, circuit block 316 serves to eliminate high frequency components included in the intensity distribution of the images and may include a delay circuit for delaying each output signal from A/D conversion circuit 238 by one-picture-element-delivery time and an adder for adding the output signal $Mk + 1$ directly provided by circuit block 314 to the output signal Mk delayed by the delay circuit.

Although the present invention has been described in its preferred forms with a certain degree of particularity it is to should understood that the present invention be not be limited by any of the details of the description, unless otherwise specified, but rather be constructed broadly within its spirit and scope as set out in the accompanying claims.

What is claimed is:

1. A focus detection system for detecting the focus condition of an objective lens, comprising:

optical means for forming displaced first and second images of an object;

first and second image signal generating means having first and second sensors positioned to receive the first and second object images and adapted to generate the first and second object image signals corresponding to the light intensity distributions of the object images of the first and second sensors, respectively;

correlation calculating means for calculating correlation between the first and second image signals while repeatedly shifting the second image signal relative to the first image signal by a given pitch to provide a correlation value for each shift;

best correlation finding means for finding a best correlation based on the plurality of correlations;

contrast detecting means for detecting a contrast of one of the object images on the first and second sensors;

discriminating means for discriminating whether the best correlation is under a predetermined value determined in accordance with the detected contrast;

detecting means for detecting a focus condition of the objective lens on the basis of the first and second image signals; and determining means for determining whether the focus condition detected by said detecting means is reliable in accordance with the result of said discriminating means.

2. A focus detection system for detecting the focus condition of an objective lens, comprising:
- optical means for forming displaced first and second images of an object;
- first and second image signal generating means having first and second sensors positioned to receive the first and second object images and adapted to generate first and second object image signals corresponding to the light intensity distributions of the object images of the first and second sensors, respectively;
- correlation calculating means for calculating correlation value between the first and second image signals;
- contrast detecting means for detecting a contrast of one of the object images on the first and second sensors;
- normalizing means for normalizing the correlation value by the contrast detected by said contrast detecting means;
- detecting means for detecting a focus condition of the objective lens on the basis of the first and second image signals; and
- determining means for determining whether the focus condition detected by said detecting means is reliable in accordance with the normalized correlation value.

3. A focus detection system for detecting the focus condition of an objective lens, comprising:
- optical means for forming displaced first and second images of an object;
- first and second image signal generating means having first and second sensors positioned to receive the first and second object images and adapted to generate first and second object image signals corresponding to the light intensity distributions of the object images of the first and second sensors, respectively;
- correlation calculating means for calculating correlation value between the first and second image signals;
- contrast detecting means for detecting a contrast of one of the object images on the first and second sensors;
- detecting means for detecting a focus condition of the objective lens on the basis of the first and second image signals; and
- determining means for determining whether the focus condition detected by said detecting means is reliable, on the basis of both the correlation value calculating by said correlation calculating means and the contrast detected by said contrast detecting means.

* * * * *